(12) United States Patent
Barbieri et al.

(10) Patent No.: US 12,016,084 B2
(45) Date of Patent: Jun. 18, 2024

(54) MANAGEMENT OF A SPLIT PHYSICAL LAYER IN A RADIO AREA NETWORK

(71) Applicant: CommScope, Inc. of North Carolina, Hickory, NC (US)

(72) Inventors: Alan Barbieri, La Jolla, CA (US); Dario Fertonani, La Jolla, CA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/239,493

(22) Filed: Jan. 3, 2019

(65) Prior Publication Data

US 2019/0208575 A1 Jul. 4, 2019

Related U.S. Application Data

(60) Provisional application No. 62/613,665, filed on Jan. 4, 2018.

(51) Int. Cl.
| | | |
|---|---|---|
| *H04W 88/08* | (2009.01) | |
| *H04W 28/18* | (2009.01) | |
| *H04W 72/0446* | (2023.01) | |
| *H04W 80/02* | (2009.01) | |
| *H04W 92/10* | (2009.01) | |

(52) U.S. Cl.
CPC ........ *H04W 88/085* (2013.01); *H04W 28/18* (2013.01); *H04W 72/0446* (2013.01); *H04W 80/02* (2013.01); *H04W 92/10* (2013.01)

(58) Field of Classification Search
CPC ............... H04W 88/085; H04W 28/18; H04W 72/0446; H04W 80/02; H04W 92/10
See application file for complete search history.

(56) References Cited

U.S. PATENT DOCUMENTS

| 998,310 A | 7/1911 | Wappler |
|---|---|---|
| 5,872,774 A | 2/1999 | Wheatley, III et al. |
| 6,590,881 B1 | 7/2003 | Wallace et al. |

(Continued)

FOREIGN PATENT DOCUMENTS

| EP | 2512202 B1 | 11/2013 |
|---|---|---|
| EP | 3051861 A1 | 8/2016 |

(Continued)

OTHER PUBLICATIONS

USPTO, Non-Final Office Action for related U.S. Appl. No. 15/701,315, dated Mar. 19, 2019.

(Continued)

Primary Examiner — Michael J Moore, Jr.
(74) Attorney, Agent, or Firm — Fogg & Powers LLC

(57) ABSTRACT

Methods and systems for facilitating communication between a core network and a wireless terminal in an upper first-level protocol unit (UL1) of a radio access network (RAN) as disclosed. An upper first level protocol unit (UL1) performs a first portion of a first-level protocol of the RAN in a first apparatus and communicates over a fronthaul link with a lower first-level protocol unit (LL1). The LL1 is in a second apparatus separate from the first apparatus. A communication quality parameter for communication between the first apparatus and the LL1 is determined, and a message related to the communication quality parameter is sent by the UL1 to an entity of the RAN other than the LL1.

26 Claims, 6 Drawing Sheets

(56) References Cited

U.S. PATENT DOCUMENTS

| | | |
|---|---|---|
| 6,621,813 B2 | 9/2003 | Petch et al. |
| 6,745,012 B1 | 6/2004 | Ton |
| 6,963,552 B2 | 11/2005 | Sabat, Jr. et al. |
| 7,200,391 B2 | 4/2007 | Chung et al. |
| 7,398,106 B2 | 7/2008 | Conyers et al. |
| 7,474,891 B2 | 1/2009 | Toms et al. |
| 7,558,356 B2 | 7/2009 | Pollman et al. |
| 7,640,019 B2 | 12/2009 | Conyers et al. |
| 7,787,854 B2 | 8/2010 | Conyers et al. |
| 7,995,493 B2 | 8/2011 | Anderlind et al. |
| 8,050,296 B2 | 11/2011 | Österling |
| 8,060,058 B2 | 11/2011 | Ch'ng et al. |
| 8,379,625 B2 | 2/2013 | Humblet |
| 8,452,299 B2 | 5/2013 | Raghothaman |
| 8,520,659 B2 | 8/2013 | Humblet |
| 8,682,338 B2 | 3/2014 | Lemson et al. |
| 8,737,454 B2 | 5/2014 | Wala et al. |
| 8,750,271 B2 | 6/2014 | Jones |
| 8,762,510 B2 | 6/2014 | Sabat, Jr. et al. |
| 8,780,802 B2 | 7/2014 | Wu et al. |
| 8,817,848 B2 | 8/2014 | Lemson et al. |
| 8,855,036 B2 | 10/2014 | Sabat et al. |
| 8,908,650 B2 | 12/2014 | Aarflot et al. |
| RE45,321 E | 1/2015 | Fischer et al. |
| 8,929,288 B2 | 1/2015 | Stewart et al. |
| 8,937,904 B2 | 1/2015 | Machida |
| 8,964,641 B2 | 2/2015 | Dalela et al. |
| 9,014,052 B2 | 4/2015 | Gravely et al. |
| 9,059,778 B2 | 6/2015 | Ling |
| 9,179,321 B2 | 11/2015 | Hasarchi et al. |
| 9,301,198 B2 | 3/2016 | Li et al. |
| 9,313,827 B2 | 4/2016 | Ilyadis |
| 9,359,074 B2 | 6/2016 | Ganesh et al. |
| 9,380,466 B2 | 6/2016 | Eyuboglu et al. |
| 9,392,635 B2 | 7/2016 | Hahn et al. |
| 9,414,399 B2 | 8/2016 | Eyuboglu et al. |
| 9,712,343 B2 | 7/2017 | Dussmann et al. |
| 9,729,215 B2 | 8/2017 | Rahman et al. |
| 9,769,766 B2 | 9/2017 | Hejazi et al. |
| 9,820,171 B2 | 11/2017 | Lemson et al. |
| 9,847,816 B2 | 12/2017 | Zhuang et al. |
| 9,867,052 B2 | 1/2018 | Sabat et al. |
| 9,876,585 B2 | 1/2018 | Gage |
| 9,877,340 B1 | 1/2018 | Park et al. |
| 9,917,622 B2 | 3/2018 | Lange |
| 9,936,470 B2 | 4/2018 | Eyuboglu et al. |
| 9,973,939 B2 | 5/2018 | Ross |
| 9,998,310 B2 | 6/2018 | Barbieri et al. |
| 10,045,314 B2 | 8/2018 | Stapleton et al. |
| 10,057,916 B2 | 8/2018 | Barabell et al. |
| 10,064,019 B2 | 8/2018 | Gustafson et al. |
| 10,070,432 B1 * | 9/2018 | Luo .................. H04W 72/0433 |
| 10,080,178 B2 | 9/2018 | Stapleton et al. |
| 10,084,537 B2 | 9/2018 | Stephens et al. |
| 10,097,391 B2 | 10/2018 | Fertonani et al. |
| 10,104,558 B2 | 10/2018 | Tarlazzi et al. |
| 10,116,376 B2 | 10/2018 | Weckerle et al. |
| 10,149,312 B2 | 12/2018 | Yan et al. |
| 10,159,074 B2 | 12/2018 | Lemson et al. |
| 10,165,459 B2 | 12/2018 | Jack et al. |
| 10,231,256 B2 * | 3/2019 | Checko ................ H04L 43/106 |
| 10,244,507 B2 | 3/2019 | Tarlazzi et al. |
| 10,313,917 B2 | 6/2019 | Halabian et al. |
| 10,334,499 B2 | 6/2019 | Stapleton et al. |
| 10,341,880 B2 | 7/2019 | Lange et al. |
| 10,355,895 B2 | 7/2019 | Barbieri et al. |
| 10,383,024 B2 | 8/2019 | Imana |
| 10,499,388 B2 | 12/2019 | Tarlazzi |
| 10,531,351 B2 * | 1/2020 | Li ....................... H04L 41/0896 |
| 10,608,734 B2 | 3/2020 | Barbieri et al. |
| 10,609,582 B2 | 3/2020 | Hannan et al. |
| 10,616,016 B2 | 4/2020 | Fertonani et al. |
| 10,638,266 B2 | 4/2020 | Huang et al. |
| 10,749,721 B2 | 8/2020 | Fertonani et al. |
| 10,764,846 B2 | 9/2020 | Eyuboglu et al. |
| 10,785,791 B1 | 9/2020 | Eyuboglu |
| 11,088,930 B2 | 8/2021 | Ruffini et al. |
| 11,528,640 B2 * | 12/2022 | Na .................. H04W 74/0833 |
| 2002/0118669 A1 | 8/2002 | Kauhanen |
| 2002/0196749 A1 | 12/2002 | Eyuboglu et al. |
| 2005/0286507 A1 | 12/2005 | Österling et al. |
| 2007/0177552 A1 | 8/2007 | Wu et al. |
| 2007/0223423 A1 | 9/2007 | Kim et al. |
| 2008/0181171 A1 | 7/2008 | Koziy et al. |
| 2011/0009105 A1 | 1/2011 | Lee et al. |
| 2012/0113972 A1 | 5/2012 | Liu et al. |
| 2012/0157089 A1 | 6/2012 | Yang et al. |
| 2012/0163299 A1 | 6/2012 | Chen et al. |
| 2012/0207206 A1 | 8/2012 | Samardzija et al. |
| 2012/0250740 A1 | 10/2012 | Ling |
| 2012/0300710 A1 | 11/2012 | Li et al. |
| 2013/0100907 A1 | 4/2013 | Liu |
| 2013/0128810 A1 | 5/2013 | Lee et al. |
| 2013/0235878 A1 | 9/2013 | Hirota |
| 2013/0279452 A1 | 10/2013 | Liu |
| 2013/0322273 A1 | 12/2013 | Etemad et al. |
| 2013/0324076 A1 | 12/2013 | Harrang |
| 2013/0329633 A1 | 12/2013 | Dalela et al. |
| 2014/0029431 A1 | 1/2014 | Haberland et al. |
| 2014/0031049 A1 | 1/2014 | Sundaresan et al. |
| 2014/0036770 A1 | 2/2014 | Stapleton et al. |
| 2014/0146905 A1 | 5/2014 | Zavadsky et al. |
| 2014/0146906 A1 | 5/2014 | Zavadsky et al. |
| 2014/0171063 A1 | 6/2014 | Mori |
| 2014/0185601 A1 | 7/2014 | Ilyadis |
| 2014/0201383 A1 | 7/2014 | Kuehnel et al. |
| 2014/0213249 A1 | 7/2014 | Kang et al. |
| 2014/0226481 A1 | 8/2014 | Dahod et al. |
| 2014/0226736 A1 | 8/2014 | Niu et al. |
| 2014/0241224 A1 | 8/2014 | Fischer et al. |
| 2014/0241315 A1 | 8/2014 | Niu et al. |
| 2014/0255034 A1 | 9/2014 | Huo |
| 2014/0286165 A1 | 9/2014 | Chowdhury et al. |
| 2014/0286239 A1 | 9/2014 | Chowdhury et al. |
| 2014/0286256 A1 * | 9/2014 | Chowdhury ............ H04L 47/14 370/328 |
| 2014/0286258 A1 | 9/2014 | Chowdhury et al. |
| 2014/0293784 A1 | 10/2014 | Haberland |
| 2014/0301288 A1 | 10/2014 | Koc et al. |
| 2014/0303814 A1 | 10/2014 | Burema et al. |
| 2014/0349667 A1 | 11/2014 | Hahn et al. |
| 2014/0362801 A1 | 12/2014 | Morita |
| 2014/0378047 A1 | 12/2014 | Kennard |
| 2015/0117470 A1 | 4/2015 | Ryan et al. |
| 2015/0163772 A1 | 6/2015 | Ni et al. |
| 2015/0189692 A1 | 7/2015 | Portolan et al. |
| 2015/0215044 A1 | 7/2015 | Cvijetic et al. |
| 2015/0229372 A1 | 8/2015 | Perlman et al. |
| 2015/0229397 A1 | 8/2015 | Shibata et al. |
| 2015/0230287 A1 | 8/2015 | Moon et al. |
| 2015/0303950 A1 | 10/2015 | Shattil |
| 2015/0341941 A1 | 11/2015 | Nguyen |
| 2015/0365934 A1 | 12/2015 | Liu et al. |
| 2015/0372728 A1 | 12/2015 | Rahman et al. |
| 2015/0381217 A1 | 12/2015 | Kim et al. |
| 2016/0026996 A1 | 1/2016 | Jain |
| 2016/0080027 A1 | 3/2016 | Agata et al. |
| 2016/0128085 A1 | 5/2016 | Liu et al. |
| 2016/0143016 A1 | 5/2016 | Chanclou et al. |
| 2016/0165521 A1 | 6/2016 | Choi et al. |
| 2016/0183248 A1 | 6/2016 | Niu et al. |
| 2016/0192181 A1 | 6/2016 | Choi et al. |
| 2016/0212747 A1 | 7/2016 | Effenberger et al. |
| 2016/0242147 A1 | 8/2016 | Tarlazzi et al. |
| 2016/0255613 A1 | 9/2016 | Faerber et al. |
| 2016/0269961 A1 | 9/2016 | Imana |
| 2016/0270006 A1 | 9/2016 | Choi et al. |
| 2016/0323067 A1 | 11/2016 | Jana et al. |
| 2016/0352002 A1 | 12/2016 | Aue |
| 2017/0012833 A1 | 1/2017 | Kumar et al. |
| 2017/0064661 A1 | 3/2017 | Katagiri et al. |
| 2017/0164215 A1 | 6/2017 | Chen et al. |
| 2017/0164336 A1 | 6/2017 | Boldi et al. |
| 2017/0238361 A1 | 8/2017 | Pawar et al. |

(56) References Cited

U.S. PATENT DOCUMENTS

| | | | |
|---|---|---|---|
| 2017/0250927 A1 | 8/2017 | Stapleton et al. | |
| 2017/0288695 A1 | 10/2017 | Feng et al. | |
| 2017/0373890 A1* | 12/2017 | Fertonani | H04L 1/0006 |
| 2018/0000736 A1 | 1/2018 | Martin et al. | |
| 2018/0007736 A1 | 1/2018 | Ruttik et al. | |
| 2018/0013581 A1 | 1/2018 | Fertonani et al. | |
| 2018/0013597 A1 | 1/2018 | Barbieri et al. | |
| 2018/0034669 A1 | 2/2018 | Barbieri et al. | |
| 2018/0041327 A1* | 2/2018 | Wolff | H04L 5/1492 |
| 2018/0042003 A1* | 2/2018 | Chen | H04W 72/042 |
| 2018/0049270 A1* | 2/2018 | Kubota | H04W 88/08 |
| 2018/0063847 A1 | 3/2018 | Huang et al. | |
| 2018/0167889 A1* | 6/2018 | Rajagopal | H04W 52/146 |
| 2018/0184344 A1 | 6/2018 | Periyasamy et al. | |
| 2018/0227028 A1* | 8/2018 | Lee | H04B 7/06 |
| 2018/0234875 A1 | 8/2018 | Leroudier | |
| 2018/0248787 A1* | 8/2018 | Rajagopal | H04W 28/0278 |
| 2018/0249375 A1* | 8/2018 | Goldhamer | H04L 1/1812 |
| 2018/0270875 A1* | 9/2018 | Hampel | H04W 84/18 |
| 2018/0279143 A1* | 9/2018 | Bhattad | H04W 52/325 |
| 2018/0287696 A1 | 10/2018 | Barbieri et al. | |
| 2018/0316395 A1* | 11/2018 | Sundararajan | H04W 72/10 |
| 2018/0359770 A1* | 12/2018 | Huang | H04W 72/1231 |
| 2019/0007246 A1 | 1/2019 | Fertonani et al. | |
| 2019/0007954 A1* | 1/2019 | Mach | H04W 72/04 |
| 2019/0059039 A1* | 2/2019 | Centonza | H04W 76/19 |
| 2019/0116568 A1 | 4/2019 | Fertonani et al. | |
| 2019/0166593 A1* | 5/2019 | Liao | H04L 5/0094 |
| 2019/0191398 A1 | 6/2019 | Ruffini et al. | |
| 2019/0200373 A1* | 6/2019 | Becvar | H04W 72/1252 |
| 2019/0208575 A1* | 7/2019 | Barbieri | H04W 80/02 |
| 2019/0245720 A1 | 8/2019 | Wang et al. | |
| 2020/0084808 A1* | 3/2020 | Oak | H04L 69/321 |
| 2020/0204252 A1 | 6/2020 | Barbieri et al. | |
| 2020/0235788 A1* | 7/2020 | Rajagopal | H04B 7/04 |
| 2020/0236592 A1* | 7/2020 | Berg | H04L 27/2636 |
| 2020/0266864 A1* | 8/2020 | Lee | H04B 7/0456 |
| 2020/0287608 A1* | 9/2020 | Trojer | H04B 7/0456 |
| 2021/0282101 A1 | 9/2021 | Fertonani et al. | |

FOREIGN PATENT DOCUMENTS

| | | |
|---|---|---|
| EP | 2632072 B1 | 11/2016 |
| EP | 3158824 B1 | 3/2018 |
| WO | 9824256 A2 | 6/1998 |
| WO | 2010139112 A1 | 12/2010 |
| WO | 2014018864 A1 | 1/2014 |
| WO | 2014076004 A2 | 5/2014 |
| WO | 2014076004 A3 | 7/2014 |
| WO | 2014110730 A1 | 7/2014 |
| WO | 2015004507 A1 | 1/2015 |
| WO | 2015037857 A1 | 3/2015 |
| WO | 2015044871 A1 | 4/2015 |
| WO | 2015060562 A1 | 4/2015 |
| WO | 2015100589 A1 | 7/2015 |
| WO | 2016113469 A1 | 7/2016 |
| WO | 2016145371 A2 | 9/2016 |
| WO | 2016145371 A3 | 9/2016 |
| WO | 2017070635 A1 | 4/2017 |
| WO | 2017077361 A1 | 5/2017 |
| WO | 2017152982 A1 | 9/2017 |
| WO | 2017174111 A1 | 10/2017 |
| WO | 2018017468 A1 | 1/2018 |
| WO | 2018030508 A1 | 2/2018 |

OTHER PUBLICATIONS

USPTO, Non-Final Office Action for related U.S. Appl. No. 15/701,315, dated Jul. 17, 2019.
USPTO, Notice of Allowance for related U.S. Appl. No. 15/549,381 dated May 8, 2019.
Young, Bruce, Response/Amendment to Non-Final Office Action for related U.S. Appl. No. 15/701,315, dated Mar. 21, 2019.
European Patent Office, Examination Report for related case EP 16762643.1, dated Aug. 30, 2019.
USPTO, Final Office Action for related U.S. Appl. No. 15/701,315, dated Dec. 23, 2019.
USPTO, Non-final Office Action for related U.S. Appl. No. 15/549,381 dated Jan. 25, 2019.
Young, Bruce, Response Final Office Action for related U.S. Appl. No. 15/701,315, dated Jan. 20, 2020.
Young, Bruce, Response Non-final Office Action for related U.S. Appl. No. 15/701,315, dated Sep. 19, 2019.
Young, Bruce, Response/Amendment to Non-final Office Action for related U.S. Appl. No. 15/549,381 dated Mar. 6, 2019.
Aleksandra Checko et al., 'Cloud RAN for Mobile Networks—A Technology Overview', IEEE Communications Surveys & Tutorials, pp. 1-24, Jan. 2015.
Barbieri and Fertonani, Distributed Radio Access Network With Adaptive Fronthaul, Unpublished U.S. Appl. No. 15/549,381, filed Aug. 8, 2017.
Choi, et al., Full-Duplex Wireless Design, Jul. 14, 2014, retrieved from http://sing.stanford.edu/fullduplex/ on Jul. 9, 2017.
Common Public Radio Interface (CPRI); Interface Specification, V7.0, Oct. 9, 2015, retrieved from http://www.cpri.info/downloads/CPRI_v_7_0_2015-10-09.pdf on Feb. 25, 2015.
Common Public Radio Interface, Mar. 11, 2015, retrieved from http://www.ieee802.org/1/files/public/docs2015/liaison-CPRI_Tdoc_1124_presentation-0315.pdf on Feb. 25, 2015.
European Patent Office, Supplemental Search Report for related application EP 1676243.1, dated Aug. 16, 2018.
Fertonani and Barbieri, Baseband Unit with Adaptive Fronthaul Link and Dynamic RAN Parameters, Unpublished U.S. Appl. No. 16/122,687, filed Sep. 5, 2018.
Fertonani and Barbieri, Synchronization of Radio Units in Radio Access Networks, Unpublished U.S. Appl. No. 16/217,215, filed Dec. 12, 2018.
Fertonani and Barbieri, Remote Radio Unit with Adaptive Fronthaul Link for a Distributed Radio Access Network, Unpublished U.S. Appl. No. 15/701,315, filed Sep. 11, 2017.
Haijun Zhang et al., 'Cooperative Interference Mitigation and Handover Management for Heterogeneous Cloud Small Cell Networks', In: IEEE Wireless Communications, Jul. 6, 2015, vol. 22, Issue 3, pp. 92-99.
J. J. van de Beek, M. Sandell and P. O. Borjesson, ML estimation of time and frequency offset in OFDM systems, IEEE Transactions on Signal Processing, vol. 45, No. 7, pp. 1800-1805, Jul 1997.
Korean Intellectual Property Office, International Search Report for PCT/US2016/022114, dated Nov. 17, 2016.
Korean Intellectual Property Office, International Search Report for PCT/US2016/058351, dated Apr. 11, 2017.
Korean Intellectual Property Office, Written Opinion of the International Searching Authority for PCT/US2016/022114, dated Nov. 17, 2016.
Korean Intellectual Property Office, Written Opinion of the International Searching Authority for PCT/US2016/058351, dated Apr. 11, 2017.
Liang Liu et al., 'Optimized Uplink Transmission in Multi-Antenna C-RAN With Spatial Compression and Forward', In: IEEE Transactions on Signal Processing, Jun. 25, 2015, vol. 63, Issue 19, pp. 5083-5095.
LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12), Feb. 2015, retrieved from http://www.etsi.org/deliver/etsi_ts/136300_136399/136300/12.04.00_60/ts_136300v120400p.pdf on Mar. 2, 2016.
LTE; Evolved Universal Terrestrial Radio Access (E-UTRA); Medium Access Control (MAC) protocol specification (3GPP TS 36.321 version 12.4.0 Release 12); Feb. 2015, retrieved from http://www.etsi.org/deliver/etsi_ts/136300_136399/136321/12.04.00_60/ts_136321v120400p.pdf on Mar. 2, 2016.
LTE; Evolved Universal Terrestrial Radio Access (E-UTRA); Physical channels and modulation (3GPP TS 36.211 version 12.4.0

(56) References Cited

OTHER PUBLICATIONS

Release 12), Feb. 2015, retrieved from http://www.etsi.org/deliver/etsi_ts/136200_136299/136211/12.04.00_60/ts_136211v120400p.pdf on Mar. 5, 2016.
LTE; Evolved Universal Terrestrial Radio Access (E-UTRA);LTE physical layer; General description (3GPP TS 36.201 version 12.1.0 Release 12), Feb. 2015, retrieved from http://www.etsi.org/deliver/etsi_ts/136200_136299/136201/12.01.00_60/ts_136201v120100p.pdf on May 16, 2016.
M. Morelli and U. Mengali, Carrier-frequency estimation for transmissions over selective channels,IEEE Transactions on Communications, vol. 48, No. 9, pp. 1580-1589, Sep. 2000.
Mayank Jain et al. in "Practical, Real-time, Full Duplex Wireless" published in the Proceedings of the 17th Annual International Conference on Mobile Computing and Networking (Mobicom 2011), Sep. 19, 2011.
Milosavljevic, Milos, Combined optical and wireless/wireline access based on existing requirements, Version 1.0, Sep. 30, 2011, retrieved from http://cordis.europa.eu/docs/projects/cnect/4/248654/080/deliverables/001-AccordanceD53WP5201130SeptemberUHv10.pdf on Feb. 10, 2016.
NGMN Alliance, 'Further Study on Critical C-RAN Technologies', version 1.0, Mar. 31, 2015.
Nui et al., RAN architecture options and performance for 5G network evolution, 2014 IEEE Wireless Communications and Networking Conference Workshops (WCNCW) IEEE, Apr. 6, 2014, pp. 294-298.
Small Cell Forum, Document 082.09.04 FAPI and nFAPI specifications, Release 9.0, Jan. 28, 2017, Retrieved from http://scf.io/en/documents/082_-_nFAPI_and_FAPI_specifications.php on Dec. 21, 2018.
Uwe et al., Quantitative Analysis of Split Base Station Processing and Determination of Advantageous Architectures for LTE, Bell Labs Technical Journal, vol. 18, No. 1, May 30, 2013, pp. 105-128.
Young, Bruce, Response Non-final Office Action for related U.S. Appl. No. 15/549,381 dated Mar. 6, 2019.
USPTO, Non-Final Office Action for related U.S. Appl. No. 16/122,687, dated Jan. 23, 2020.
USPTO, Non-Final Office Action in related U.S. Appl. No. 16/217,215.
USPTO, Notice of Allowance for related U.S. Appl. No. 15/701,315, dated Feb. 10, 2020.
Yuan, J Huang, et al., "Rethink fronthaul for soft RAN," Communications Magazine, IEEE, vol. 53, No. 9, pp. 82-88, Sep. 2015.
USPTO, Notice of Allowance for related U.S. Appl. No. 16/122,687, dated Jun. 2, 2020.
CPRI, "A Successful Industry cooperation", http://www.cpri.info, at least as early as Feb. 10, 2016, pp. 1 through 4, www.cpri.info.
CPRI, "Common Public Radio Interface (CPRI); Interface Specification", CPRI Specification V6.1, Jul. 1, 2014, pp. 1 through 129.
European Patent Office, "Communication under Rule 71(3) from EP Application No. 16762643.1", from Foreign Counterpart to U.S. Appl. No. 15/549,381, dated Jul. 24, 2020, pp. 1 through 5, Published: EP.
Gray, "Quantization", IEEE Transactions on Information Theory, Oct. 1998, pp. 2325 through 2383, vol. 44, No. 6, IEEE.
Haberland et al. "Base Stations in the Cloud", ITG Fachtagung Wien, Sep. 28, 2012, pp. 1 through 23, Alcatel-Lucent.
International Bureau, "International Preliminary Report on Patentability from PCT Application No. PCT/US2016/022114", from Foreign Counterpart to U.S. Appl. No. 15/549,381, dated Sep. 12, 2017, pp. 1 through 23, Published: WO.
International Bureau, "International Preliminary Report on Patentability from PCT Application No. PCT/US2017/042359", from Foreign Counterpart to U.S. Appl. No. 16/217,215, dated Jan. 22, 2019, pp. 1 through 7, Published: WO.
International Searching Authority, "International Search Report and Written Opinion from PCT Application No. PCT/US2017/042359", from Foreign Counterpart to U.S. Appl. No. 16/217,215, dated Oct. 30, 2017, pp. 1 through 9, Published: WO.

Nieman et al., "Time-Domain Compression of Complex-Baseband LTE Signals for Cloud Radio Access Networks", IEEE Global Conference on Signal and Information Processing, 2013, pp. 1 through 4.
Saifur et al., "Methods and Apparatus for OFDM Signal Compression", U.S. Appl. No. 62/015,884, filed Jun. 23, 2014, pp. 1 through 40, Published: US.
Saifur et al., "Methods and Apparatus for OFDM Signal Compression", U.S. Appl. No. 62/094,780, filed Dec. 19, 2014, pp. 1 through 46, Published: US.
Samardzija et al., "Compressed Transport of Baseband Signals in Radio Access Networks", IEEE Transactions on Wireless Communications, 2012, pp. 1 through 10, IEEE.
Samplify, "Compression of Wireless Signals: Prism IQ", Nov. 2, 2011, pp. 1 through 2, Samplify Systems.
Samplify, "General Purpose Signal Compression: Prism 3.0", Nov. 2, 2011, pp. 1 through 2, Samplify Systems.
Samplify, "Prism Compression", Jan. 1, 2012, pp. 1 through 2, Samplify Systems.
Small Cell Forum, "Document 082.09.04 FAPI and nFAPI specifications", Small Cell Forum Release 9.0, Feb. 2017, pp. 1 through 283, www.scf.io.
U.S. Patent and Trademark Office, "Corrected Notice of Allowability", U.S. Appl. No. 15/765,254, dated Feb. 27, 2020, pp. 1 through 6, Published: US.
U.S. Patent and Trademark Office, "Final Office Action", U.S. Appl. No. 15/701,290, dated Mar. 15, 2018, pp. 1 through 13, Published: US.
U.S. Patent and Trademark Office, "Final Office Action", U.S. Appl. No. 15/765,254, dated Dec. 4, 2019, pp. 1 through 21, Published: US.
U.S. Patent and Trademark Office, "Final Office Action", U.S. Appl. No. 16/217,215, Jun. 25, 2020, pp. 1 through 13, Published: US.
U.S. Patent and Trademark Office, "Notice of Allowance", U.S. Appl. No. 15/701,290, dated Apr. 24, 2018, pp. 1 through 5, Published: US.
U.S. Patent and Trademark Office, "Notice of Allowance", U.S. Appl. No. 15/701,362, dated Aug. 28, 2018, pp. 1 through 19, Published: US.
U.S. Patent and Trademark Office, "Notice of Allowance", U.S. Appl. No. 15/765,254, dated Jan. 14, 2020, pp. 1 through 12, Published: US.
U.S. Patent and Trademark Office, "Notice of Allowance", U.S. Appl. No. 16/217,215, dated Oct. 6, 2020, pp. 1 through 14, Published: US.
U.S. Patent and Trademark Office, "Office Action", U.S. Appl. No. 15/701,290, dated Nov. 14, 2017, pp. 1 through 23, Published: US.
U.S. Patent and Trademark Office, "Office Action", U.S. Appl. No. 15/765,254, dated Jul. 25, 2019, pp. 1 through 41, Published: US.
U.S. Patent and Trademark Office, "Office Action", U.S. Appl. No. 16/217,215, dated Feb. 10, 2020, pp. 1 through 12, Published: US.
U.S. Patent and Trademark Office, "Restriction Requirement", U.S. Appl. No. 15/701,362, dated Jun. 28, 2018, pp. 1 through 5, Published: US.
U.S. Patent and Trademark Office, "Supplemental Notice of Allowability", U.S. Appl. No. 15/765,254, dated Jan. 31, 2020, pp. 1 through 10, Published: US.
Young, "Response Non-final Office Action for related U.S. Appl. No. 15/701,362", dated Jun. 30, 2018, pp. 1 through 10.
Young, "Response to Final Office Action for related U.S. Appl. No. 16/122,687", dated Apr. 23, 2020, pp. 1 through 14.
Young, "Response/Amendment to Final Office Action for related U.S. Appl. No. 15/701,290", dated Mar. 22, 2018, pp. 1 through 8.
Young, "Response/Amendment to Non-Final Office Action for related U.S. Appl. No. 15/701,290", dated Feb. 12, 2018, pp. 1 through 12.
Zhu et al., "Virtual Base Station Pool: Towards A Wireless Network Cloud for Radio Access Networks", CF' 10, May 2010, pp. 1 through 10, Bertinoro, Italy.
U.S. Patent and Trademark Office, "Office Action", U.S. Appl. No. 16/506,574, Mar. 3, 2021, pp. 1 through 52, Published: US.

(56) References Cited

OTHER PUBLICATIONS

U.S. Patent and Trademark Office, "Notice of Allowance", U.S. Appl. No. 16/217,215, Feb. 24, 2021, pp. 1 through 18, Published: US.

European Patent Office, "Extended European Search Report from EP Application No. 20216637.7", from Foreign Counterpart to U.S. Appl. No. 15/549,381, May 12, 2021, pp. 1 through 15, Published: EP.

Lorca et al., "Lossless Compression Technique for the Fronthaul of LTE/LTE-Advanced Cloud-RAN Architectures", 2013 IEEE 14th International Symposium on A World of Wireless, Mobile and Multimedia Networks (WOWMOM), Jun. 4, 2013, pp. 1 through 9, IEEE.

U.S. Patent and Trademark Office, "Notice of Allowance", U.S. Appl. No. 16/217,215, Jul. 8, 2021, pp. 1 through 16, Published: US.

U.S. Patent and Trademark Office, "Notice of Allowance", U.S. Appl. No. 16/806,574, Aug. 26, 2021, pp. 1 through 18, Published: US.

U.S. Patent and Trademark Office, "Office Action", U.S. Appl. No. 16/217,215, Dec. 8, 2021, pp. 1 through 16, Published: US.

U.S. Patent and Trademark Office, "Notice of Allowance", U.S. Appl. No. 16/806,574, Feb. 2, 2022, pp. 1 through 20, Published: US.

U.S. Patent and Trademark Office, "Notice of Allowance", U.S. Appl. No. 16/217,215, Apr. 28, 2022, pp. 1 through 14, Published: US.

U.S. Patent and Trademark Office, "Notice of Allowance", U.S. Appl. No. 16/806,574, May 18, 2022, pp. 1 through 11, Published: US.

U.S. Patent and Trademark Office, "Office Action", U.S. Appl. No. 16/985,666, Mar. 15, 2022, pp. 1 through 67, Published: US.

U.S. Patent and Trademark Office, "Notice of Allowance", U.S. Appl. No. 16/217,215, Sep. 28, 2022, pp. 1 through 14, Published: US.

U.S. Patent and Trademark Office, "Notice of Allowance", U.S. Appl. No. 16/806,574, Sep. 23, 2022, pp. 1 through 12, Published: US.

U.S. Patent and Trademark Office, "Notice of Allowance", U.S. Appl. No. 16/985,666, Aug. 31, 2022, pp. 1 through 14, Published: US.

U.S. Patent and Trademark Office, "Notice of Allowance", U.S. Appl. No. 16/217,215, Jan. 25, 2023, pp. 1 through 10, Published: US.

U.S. Patent and Trademark Office, "Notice of Allowance", U.S. Appl. No. 16/985,666, Dec. 13, 2022, pp. 1 through 10, Published: US.

European Patent Office, "Communication pursuant to Article 71(3) EPC", from EP Application No. 20216637.7, from Foreign Counterpart to U.S. Appl. No. 16/239,493, Apr. 14, 2023, pp. 1 through 119, Published: EP.

U.S. Patent and Trademark Office, "Notice of Allowance", U.S. Appl. No. 16/806,574, Feb. 28, 2023, pp. 1 through 11, Published: US.

U.S. Patent and Trademark Office, "Notice of Allowance", U.S. Appl. No. 16/985,666, Mar. 28, 2023, pp. 1 through 10, Published: US.

U.S. Patent and Trademark Office, "Notice of Allowance", U.S. Appl. No. 16/985,666, Jul. 10, 2023, Page(s) through 10, Published: US.

U.S. Patent and Trademark Office, "Notice of Allowance", U.S. Appl. No. 16/806,574, Jul. 13, 2023, pp. 1 through 17, Published: US.

U.S. Patent and Trademark Office, "Office Action", U.S. Appl. No. 16/217,215, Jul. 20, 2023, pp. 1 through 36, Published: US.

U.S. Patent and Trademark Office, "Office Action", U.S. Appl. No. 17/328,648, Aug. 31, 2023, pp. 1 through 82, Published: US.

* cited by examiner

MANAGEMENT OF A SPLIT PHYSICAL LAYER IN A RADIO AREA NETWORK

CROSS-REFERENCE TO RELATED APPLICATIONS

This application claims the benefit of U.S. Provisional Application 62/613,665 entitled Methods for an Efficient Fronthaul Interface for Physical Layer Split Scenarios and filed Jan. 4, 2018. The aforementioned application is hereby incorporated by reference in its entirety herein for any and all purposes.

BACKGROUND

Technical Field

The present subject matter relates to wireless communication. More specifically, the present subject matter relates to a radio access network (RAN) using an adaptive fronthaul protocol.

Background Art

A Radio Access Network (RAN) provides access to a core network for a wireless terminal, such as a smartphone. RANs have progressed through several different generations of technology, and are sometimes referred to by a so-called "generation number," such as 3G, or 4G networks. An example 2G RAN is the GSM (Global System for Mobile Communications) Radio Access Network (GRAN), example 3G RANs include the GSM EDGE Radio Access Network (GERAN), and the Universal Mobile Telecommunications System (UMTS). An example 4G network is the Long-Term Evolution Advanced (LTE-A) which is also known as the Evolved Universal Terrestrial Radio Access Network (E-UTRAN) and may also be referred to simply as "LTE" herein. Each RAN communicates with wireless terminals using radio frequency communication protocols defined by the RAN at frequencies supported by the RAN and licensed by a particular communications company, or carrier. The frequencies are modulated using a variety of techniques, depending on the RAN, to carry digital information that can be used for voice transmission and/or data transfer.

Each RAN can define its own software structure, but many generally conform to the 7-layer Open Systems Interconnection (OSI) model. The seven layers include a lowest layer, layer 1, which is commonly referred to as the physical layer or PHY, which describes the transmission and reception of raw bit streams over a physical medium. The next layer, layer 2, is known as the data link layer, but often is referred to by the name of a protocol that resides at that layer, such as the medium access protocol (MAC), or point-to-point protocol (PPP), which provide for transmission of data frames between two nodes connected by a physical layer. The third layer, known as the network layer, manages a multi-node network and handles such issues as addressing, to send packets of data between nodes. The internet protocol (IP) is a commonly used network layer protocol. The next layer, layer 4, is known as the transport layer. Common transport protocols include the transmission control protocol (TCP) and the user datagram protocol (UDP). Transport protocols manage transmission of data segments between nodes of the network. Layer 5, the session layer, manages communication sessions, layer 6, the presentation layer, translates data between a networking service and an application, and the top layer, layer 7 or the application layer, provides high-level application programming interfaces (APIs) for network related services.

More details of an E-UTRAN are provided as an example. The specifications for E-UTRAN are developed and published by the 3rd Generation Partnership Project (3GPP). The specifications related to E-UTRAN are known as the 36 series specifications and are available for download from the 3GPP website at http://www.3gpp.org/DynaReport/36-series.htm. Several of the specifications include information helpful in understanding this disclosure, including: "LTE; Evolved Universal Terrestrial Radio Access (E-UTRA); LTE physical layer; General description," 3GPP TS 36.201 version 12.1.0 Release 12, 2015-02; "LTE; Evolved Universal Terrestrial Radio Access (E-UTRA); Physical channels and modulation," 3GPP TS 36.211 version 12.4.0 Release 12, 2015-02; "LTE; Evolved Universal Terrestrial Radio Access (E-UTRA) and Evolved Universal Terrestrial Radio Access Network (E-UTRAN); Overall description; Stage 2," 3GPP TS 36.300 version 12.4.0 Release 12, 2015-02; and "LTE; Evolved Universal Terrestrial Radio Access (E-UTRA); Medium Access Control (MAC) protocol specification," 3GPP TS 36.321 version 12.4.0 Release 12, 2015-02; all four of which are incorporated by reference herein.

In an E-UTRAN a base station is known as an enhanced node B (eNB) and a wireless terminal is known as user equipment (UE). An eNB can manage one or more cells, also called sectors, and is responsible for transmission and reception of wireless signals as well as interfacing with the core network, known as evolved packet core (EPC). It provides connectivity, that is, reliable data transfer (whenever possible), and control paths to the UEs in its coverage area. An eNB communicates with a UE using a pair of carrier frequencies, one for uplink (UL) and one for downlink (DL), if using Frequency Division Duplex (FDD), or using a single carrier frequency for both UL and DL if using Time Division Duplex (TDD). The DL uses Orthogonal Frequency Division Multiple Access (OFDMA) modulation of the carrier, and the UL uses Single-Carrier Frequency Division Multiple Access (SC-FDMA), which is also known as Linearly precoded OFDMA (LP-OFDMA). While the two modulation schemes are different, they share many similar qualities, and term "OFDM" may generally be used herein to describe either scheme.

In a traditional implementation, eNBs are separate logical entities, connected to the same core network via the S1 interface, which can be conveyed over a wired or wireless backhaul connection. An optional X2 interface may be used to directly connect neighbor eNBs. During a call, a UE may be handed over to neighbor eNBs, depending on radio conditions and traffic load. Handovers imply, among other things, a transfer of "context" of the UE being handed over, from a source eNB to a destination eNB. Such transfer may occur via the S1 interface or via the X2 interface, if available. The functions of the eNB can be broadly classified as radio frequency (RF) functions that deal with radio frequency signals, and baseband (BB) operations that deal with digital data.

eNBs implement several functions which together can be classified baseband (BB) operations. The baseband operations include the physical-layer (PHY) functions, medium access control (MAC) layer functions, radio link control (RLC) layer functions, packet data converge protocol (PDCP) layer functions, and radio resource control (RRC) layer functions.

Physical-layer (PHY) functions include, among others, transmission of downlink physical channels, such as physical downlink control channel (PDCCH), physical downlink shared channel (PDSCH), and cell-specific reference signal (CRS). The PHY layer functions also include reception of uplink physical layer channels, such as physical uplink shared channel (PUSCH), physical uplink control channel (PUCCH), physical random access channel (PRACH) and sounding reference signal (SRS). The PHY layer also handles synchronization, measurements of radio conditions, and other miscellaneous functions.

Medium access control (MAC) layer functions include scheduling, mapping of transport channels to logical channels, maintenance of uplink time alignment, hybrid automatic repeat request (HARQ) operation, and discontinuous reception (DRX). Radio link control (RLC) layer functions include concatenation, segmentation, reassembly, reordering, and error correction (through ARQ). Packet data convergence protocol (PDCP) layer functions include in-sequence delivery of data units, header compression, elimination of duplicates, ciphering and deciphering, and integrity protection and verification. Radio resource control (RRC) layer functions include broadcast of system information, connection control, mobility, and measurement configuration and control.

In a traditional implementation, all eNB functions are carried out by specialized hardware devices, dedicated telecommunications equipment, data centers, and the like. In such traditional systems, the entire eNB is located in one location, allowing the eNB to be managed as a single unit. In another implementation, one or more eNBs are managed by the same hardware device or co-located devices and the transmission and reception antennas corresponding to the eNBs are distributed in a potentially large region. In such implementation, group of co-located antennas may be denoted as remote radio heads (RRHs), and a special interface connects the processing device with the RRHs it manages.

In one implementation, which may be referred to as a distributed RAN or a Cloud-RAN, an RRH is targeted to have a smaller form factor, reduced power consumption, and lower operating expenses. To meet this goal, the RRH implements a minimum set of functions. In such implementations, the RRH may only include radio frequency (RF) functions such as amplification, filtering, up and down frequency conversion, digital to analog and analog to digital conversions, and the like, and baseband processing is still performed by dedicated equipment, which may not be co-located with the RRH.

A block diagram of a traditional distributed RAN 100 is shown in FIG. 1. The RAN 100 includes a central office 102 with one or more baseband units (BBUs) 160 that include all of the functionality for the PHY layer and the MAC layer of the RAN protocol. The RAN 100 also includes multiple RRHs 130 that include RF functionality and are each coupled to one or more antennas 131 to communicate with UE devices, such as smartphones. The interface between a BBU 160 and an RRH 130, is referred to as a fronthaul link 135. A traditional fronthaul link 135, can utilize a wired, optical, or radio frequency physical link, but the traditional fronthaul link is synchronous, low-jitter, and usually point-to-point. The fronthaul link 135 may be referred to as being "fiber-grade" indicating that it is high speed and low latency with minimal jitter. In some cases, the fronthaul link 135 uses a proprietary protocol, but in many implementations, a standardized protocol, such as the Common Public Radio Interface (CPRI) or the Open Base Station Architecture Initiative (OBSAI), is used. A central office 102 may host multiple BBUs 160, which in turn may control multiple RRHs 130. The BBUs 160 of the central office 102 are coupled to the core network, or EPC 199, by a backhaul link 190, that may utilize standard networking technology and is much more tolerant of latency and jitter issues than the fronthaul link 135.

One key issue with a distributed RAN 100 architecture is latency. Different functions in the baseband stack can have different requirements of end-to-end latency. As an example, HARQ, implemented in the MAC layer, requires an end-to-end delay of less than 4 ms in an LTE FDD (frequency division duplex) implementation. This means that from the time a UE transmits a data packet via the PUSCH channel, there is a maximum time, set by the specification, for the eNB to provide a corresponding HARQ response (e.g., a non-acknowledgement, or NACK, to the UE). The overall latency for performing a specific function of the baseband stack (e.g., downlink HARQ processing), includes the time spent by the UE to perform the function, the bidirectional propagation delay over the wireless medium, and any propagation and processing delay over the fronthaul link 135 connecting the antennas and the BBU 160.

If the overall latency for performing a specific function does not satisfy specific constraints imposed by the standard for the function, the system may fail, and communication between an eNB and a UE cannot be sustained. Thus, latency constraints need to be satisfied in all operating conditions. This requires hard, real-time, constraints on the processing of specific latency-constrained functions, or functions that have an impact on the overall system timeline. Furthermore, fronthaul propagation delays from the antennas 131 to the BBUs 160 also must be accounted for within the overall latency constraint. In order to minimize the additional latency introduced by exchange of data between the BBUs 160 and the RRHs 130, a fiber-grade fronthaul is traditionally used.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
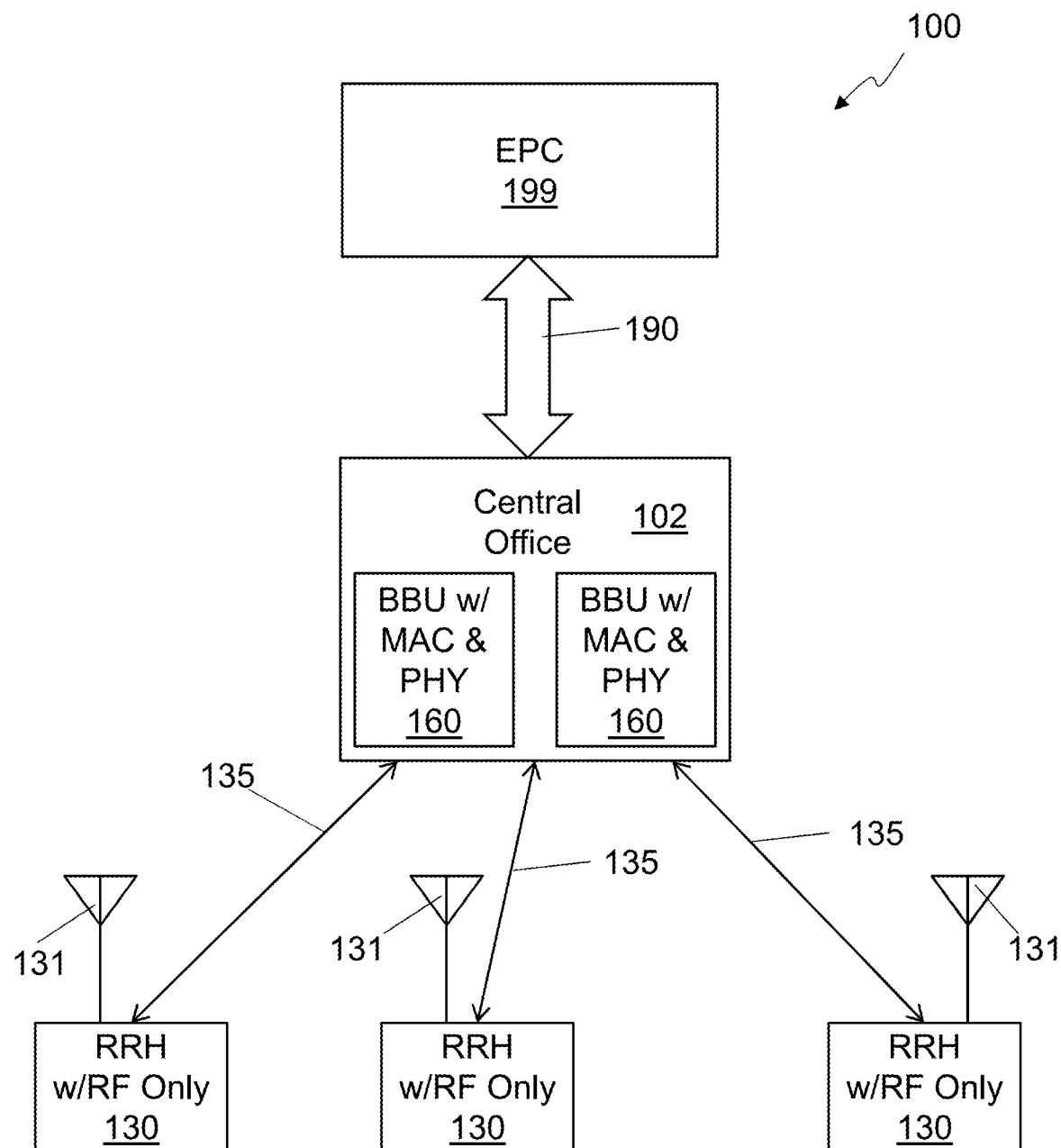
FIG. 1 is a block diagram of a traditional distributed radio access network (RAN)

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Lower first-level protocol unit (LL1), as the term is used herein, refers to a remote radio unit that includes at least a portion of the processing for the first-level protocol (e.g. the PHY layer) of a RAN. The LL1 performs functionality in the data flow between the UL1 the UE. The LL1 may or may not include the actual radio unit (e.g., modulator, power amplifier, antenna, and the like) and may be implemented in special-purpose electronics, as software running on specialized computer hardware, software running on a general purpose computer, or any combination thereof. In many embodiments, the LL1 may be on a separate apparatus from systems running the rest of the RAN protocol stack, but in some embodiments, the LL1 may be integrated with the UL1 or some other part of the RAN protocol stack. The LL1 may perform operations meant to reduce load such as antenna selection or linear spatial equalization to improve scalability in massive MIMO systems.

Upper first-level protocol unit (UL1), as the term is used herein, refers to a module that communicates with another module that performs a second-level protocol (e.g. the MAC layer) of a RAN, and also communicates with one or more LL1s. The UL1 may be implemented as software running on a dedicated computing device, or as software running as a task on a general purpose computer, although some embodiments may implement the UL1 using specialized hardware with or without software. In at least some embodiments, the UL1 includes demodulation and decoding of the uplink data to enable joint coherent reception methods.

The split of the first-level protocol into the UL1 and LL1 is consistent with "Option 7" defined by the $3^{rd}$ Generation Partnership Project (3GPP), which is a standards body for RANs. Option 7 is an intra-PHY split which puts the FFT/iFFT into the LL1 and provides several options (i.e. "7-1", "7-2", and "7-3") of how to partition the rest of the PHY functionality between the two units.

OAM can stand for "operations and management," "operations, administration and management," or "operations, administration and maintenance" which should be deemed equivalent functionality for the purposes of this disclosure. An OAM module is a software module or a combination of software and hardware that is out of the primary data flow between the core network of a RAN and a UE device and handles processes, activities, tools, and standards involved with operating, administering, managing and maintaining a RAN.

A RAN architecture is described herein that allows much of the processing of the RAN to be performed in a centralized unit (CU). The CU may include one or more UL1s and higher-level protocol processing such as the MAC layer and, in some cases, other higher protocol layers. LL1s are relatively simple devices with limited general purpose processing capabilities and are designed to be relatively low cost. A non-deterministic fronthaul link, such as an internet protocol (IP) based computer network (or heterogeneous network of networks such as the internet), can be used for communication between the UL1s and the LL1s. Lossy compression may be used on the fronthaul link to reduce the bandwidth requirements on that communication path and may be dynamically controlled based on the loading on the system. The RAN architecture described is very flexible and may apply to so-called 4G, 5G New Radio, legacy, and future RANs.

In certain implementations, different components of the RAN may be provided by different vendors. In such cases, a suitable API, commonly agreed between partners or standard bodies, is advantageous to allow for interoperability. An example of such interface is FAPI/nFAPI, a specification published by the Small Cell Forum, which is used to facilitate interoperation between Layer 1 and Layer 2.

In the case of a non-deterministic fronthaul, the inventors realized it would be advantageous to have an API that addresses fronthaul-specific functionality. Similarly, the centralized processing enabled by PHY splits can also take advantage of suitable enhancements to the API.

In embodiments, the UL1 may indicate to upper layers information related to scheduling for a certain subframe. The scheduling information may be expressed per LL1, in case more than one LL1 is coupled to the same UL1, or as a combined indication for all LL1s coupled to a particular UL1. That indication (message, protocol unit, API, or the like) may include:

Maximum capacity of the fronthaul between the UL1 and the at least one LL1. Said capacity may be expressed in terms of number of bytes per subframe, bytes per second, or as a limitation in terms of scheduling (e.g., number of resources blocks, tones, layers, constellation order, antennas, or the like). Said capacity may also be expressed as a boolean, that is, Layer 1 may request the upper layers to skip scheduling unicast traffic for said subframe, for example in case of fronthaul congestion.

Recommended capacity of the fronthaul between the UL1 and the at least one LL1.

Maximum and/or recommend capacity of the fronthaul between the at least one LL1 and the UL1.

In order for the scheduler to determine scheduling decisions compatible with the capacity provided by the UL1, the UL1 may also offer a suitable API for determining a fronthaul capacity from a set of scheduling decisions. Other aspects of the API may include determining one or more scheduling parameters that fulfill the capacity requirements (e.g., a number of resource blocks).

The UL1 may also indicate to upper layers an estimated or predicted fronthaul latency that the scheduler or other upper layers block may use, for instance, to drive scheduling decisions, adapt upper layer parameters, for admission control, or the like. Similarly, the UL1 may also indicate an estimated "fronthaul quality", which may include a packet loss estimate, out of order probability, or the like. The information may be provided in a periodic message (e.g. a subframe indication message) or may be at least in part incorporated in messages used to report to Layer 2 the uplink demodulation and/or decoding results. For example, a "DL channel state information decoded" message, delivered to Layer 2, may include a fronthaul-specific feature, such as any missing protocol unit, delay, jitter, out-of-order events, or the like, relevant for the time period of the uplink signal being decoded and signaled to Layer 2.

Uplink scheduling information provided to the UL1 may include a "spatial compression" approach (e.g., antenna selection, antenna combining, linear or non-linear, and the like). In addition or as an alternative, the scheduling decisions may include an indication of a target "quality" of the received signal, and the UL1 may use the quality requirement to determine a compression scheme over the fronthaul. The quality indication may, for example, refer to number of quantization bits. Both the spatial compression information and the quality requirement indication may be provided on a per-RX-point basis, where "RX points" are the subset of LL1s to be used by the UL1 for demodulation and/or decoding of the uplink physical signal.

Downlink scheduling information provided to the UL1 may include information about "TX points", that is, a subset of LL1s to be used for transmission of a one or more downlink physical signal. Furthermore, the way that the signal needs to be distributed among the TX points (e.g., the representation, compression, spatial information, and the like) may be expressed on a per-TX-point basis, or in common and combined way, along with said downlink scheduling information.

Special messages may be delivered by the UL1 to upper layers in case of specific fronthaul events (e.g., congestions, sudden change in capacity, latency, or the like, packet losses, link dropped, LL1 migration, or the like).

Several fronthaul-related configuration parameters may be delivered to The UL1 from upper layers, either at initialization or during processing. Said real-time parameters may include clock correction parameters, split parameters (e.g., 7-1 vs 7-2), synchronization parameters, fronthaul in-order/out-of-order processing parameters, suitable buffer sizes (function of the fronthaul static quality or network topology), or the like. The UL1 may configure some of its internal variables, parameters, and processing, based upon those configuration parameters. For example, a maximum expected fronthaul latency parameter may be used by the UL1 to configure its internal buffers (HARQ, samples, and the like).

Reference now is made in detail to the examples illustrated in the accompanying drawings and discussed below.

Figure 2:
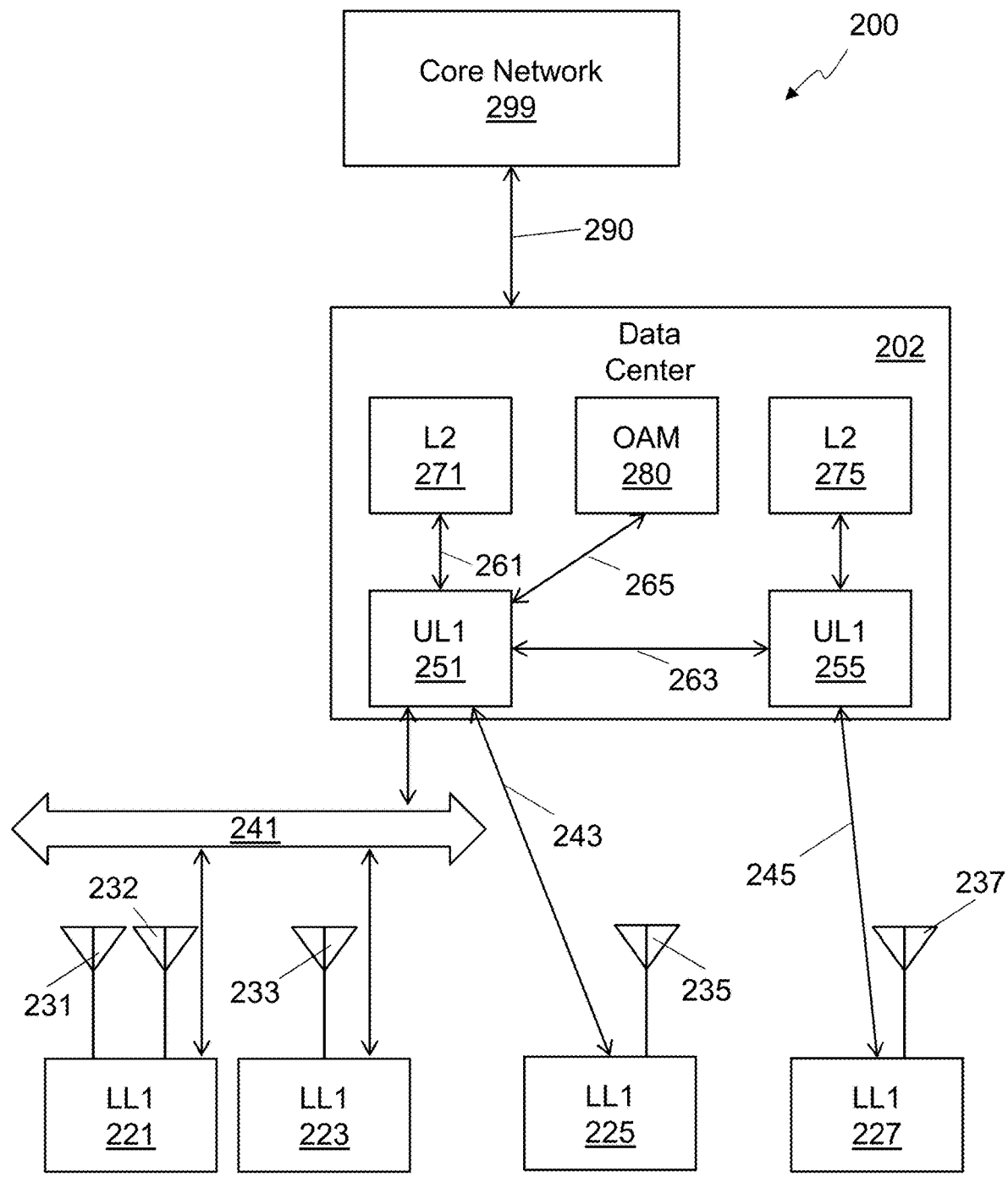
FIG. 2 is a block diagram of an embodiment of a distributed radio access network (RAN) with a split physical layer.

FIG. 2 is a block diagram of an embodiment of a distributed radio access network (RAN) 200 with a split physical layer. The RAN 200 represents a radio frequency communication system to facilitate communication between a wireless terminal and a core network 299. The RAN 200 can be any type of RAN, but in at least some embodiments, the RAN 200 is an Evolved Universal Terrestrial Radio Access Network (E-UTRAN), and the core network 299 includes an Evolved Packet Core (EPC). While an E-UTRAN system is used as an example in this document, the principles, systems, apparatus, and methods disclosed herein can be applied by one of ordinary skill to different radio access networks, including legacy networks such as Universal Mobile Telecommunications System (UMTS), other contemporary networks such as Worldwide Interoperability for Microwave Access (WiMAX), and future networks such as 5G New Radio (5GNR). In FIG. 2 arrows connecting different building blocks may represent physical media (e.g., an optical fiber or twisted pair copper wires), or logical data and/or control pipes (e.g., data streams based on the internet protocol). Such logical connections may be conveyed over a shared or dedicated physical medium. In addition, blocks required for correct network functionality, e.g., routers, switches, gateways, and the like, may be present, although they are not explicitly represented.

The embodiment of the RAN 200 includes a lower first-level protocol unit (LL1) 221 coupled to at least one antenna 231 to communicate with a wireless terminal. Depending on the system, any number of LL1s can be included, such as the four LL1s 221-227 respectively coupled to at least one antenna 231-237 as shown in FIG. 2. The multiple LL1s 221-227 can be geographically distributed and/or there can be multiple LL1s 221-227 in a single location. A single LL1 221 can be coupled to any number of antennas, although many installations couple two antennas 231, 232 to a LL1 221. An LL1 221-227 includes electronic circuitry to perform at least a first portion of a first-level protocol of the RAN 200, such as a physical layer protocol (i.e. a PHY layer), for communicating between the wireless terminal and the core network 299.

The RAN 200 also includes modules coupled to the core network 290 over a backhaul link 290 and configured to perform additional protocol of the RAN 200. In some embodiments, these modules may be included in a data center 202 and may be implemented as software running on a general purpose computer. UL1 modules 251, 255 perform a second portion of a first-level protocol, such as a PHY layer, of the RAN 200. L2 modules 271, 275 perform a second-level protocol, such as a media access control (MAC) layer. The L2 module may be referred to as a virtual network function (VNF) if the RAN 200 utilizes a small cell architecture. Other modules performing other aspects of the RAN protocol may also be included in the data center 202 and any number of L2 and/or UL1 modules may be included in the data center 202. A L2 271 may communicate 261 with any number of UL1 modules. L2 271 and UL1 251 may be implemented as separate software functions on a single computer, either in a common environment or on separate virtual machines, or they may be implemented on separate hardware platforms. In some embodiments, L2 271 and UL1 251 may be implemented on a distributed computing system or on so-called cloud computing platform such as Amazon Web Services® (AWS®), Microsoft Windows Azure®, other commercial cloud services providers, or a dedicated cloud platform. In some embodiments, the distributed RAN 200 may be referred to as a Cloud-RAN 200.

Uplink and downlink communication between a wireless terminal and the core network 299 defines a data path that includes communication 261 between the L2 271 and the UL1 251. Communication 261 may be performed using any appropriate communication technology, including, but not limited to, function calls, remote procedure calls, shared data structures in memory, communication over a dedicated hardware link, or communication over a shared bus. Although communication 261 is shown as occurring within data center 202, in some embodiments a data path may include L2 271 in a different data center with UL1 251 in data center 202 so that communication 261 occurs between data centers.

The RAN 200 also includes a fronthaul link 241 coupled to UL1 251 and the LL1s 221, 223 and utilizing an adaptive fronthaul protocol for communication between the UL1 251 and the LL1s 221, 223. Depending on the embodiment, UL1 251 may be coupled with any number of LL1s over one or more fronthaul links. In some embodiments, the fronthaul link 241 includes a non-deterministic communication link, where at least one of a latency, an arbitration, a bandwidth, a jitter, a packet order, a packet delivery, or some other characteristic of the communication link, cannot be determined with certainty in advance. In some embodiments, the fronthaul link 241 has a variable roundtrip latency with a maximum that is greater than a response time requirement for at least one message type sent by the wireless terminal and processed by the second-level protocol of the RAN 200. In at least one embodiment, the fronthaul link 241 exhibits jitter in excess of a maximum jitter requirement of the RAN 200, and in some embodiments, the fronthaul link 241 has a variable throughput with a minimum throughput less than a maximum throughput of the wireless terminal. Embodiments may utilize a fronthaul link 241 that includes an Ethernet network. In some embodiments, the adaptive fronthaul protocol comprises a packet-based protocol with non-guaranteed in-order packet delivery and/or non-guaranteed packet delivery, and may utilize an internet protocol (IP).

In the embodiment shown, at least one UL1 251 and at least one LL1 221 are connected through a logical transport channel which may be conveyed over a shared physical medium, the fronthaul link 241. For example, a protocol based on collision detection or collision avoidance, such as Ethernet, may be used to multiplex multiple transport channels over the shared medium. In such an embodiment, the reduced cost of fronthaul link 241 may significantly decrease the overall capital expenditure.

The fronthaul link 241 may include multiple networks and/or communication links coupled together with active network devices, such as bridges, routers, switches, and the like. In some installations, the fronthaul link 241 may include a link, such as a synchronous optical networking (SONET) link, from one or more UL1s 251 to a remote active network device, which then provides dedicated local links to two or more LL1a 221, 223, such as 1000Base-T Ethernet links. In this configuration, the link from the active network device to the UL1 251 is shared by multiple LL1s. Depending on the configuration of the local network of LL1s, additional portions of the fronthaul link 241, which refers to the entire communication path between a UL1 251 and a LL1 221 may also be shared by multiple LL1s and/or multiple UL1s. Thus, in some installations, two or more remote LL1s 221, 223, each coupled to respective at least one antenna 231-233, may share at least a portion of the fronthaul link 241 to communicate with the UL1 251. Additionally, in some installations two or more UL1s may share at least a portion of the fronthaul link to communicate with their respective LL1*s*.

In the example shown in FIG. 2, UL1 251 is coupled to another LL1 225 with antenna 235 by a second fronthaul link 243 which may be an adaptive fronthaul link or a deterministic fronthaul link such as CPRI. In addition, another datapath is shown from LL1 227 through fronthaul link 245 to UL1 255 and through L2 275. The fronthaul links 241, 243, 245 may be routed over multiple different physical media, and may be processed by multiple intermediate network nodes, such as routers, switches, and the like.

Additional network nodes required by the network to operate properly, such as blocks belonging to the EPC network, the mobility management unit (MME), the home subscriber server (HSS), and the like, may also be remotely located and accessible via transport channels conveyed over the core network 299. An operations, administration and management (OAM) module 280 may also be included in the data center 202 or remotely, depending on the embodiment.

Embodiments described here utilize an adaptive fronthaul protocol for communication between the LL1 and the UL1. An adaptive fronthaul protocol provides mechanisms for the UL1s and/or LL1s to react to changes in the environment, such as the fronthaul, the radio signal, the loads of the mobile terminals coupled to the LL1s, or other characteristics of the system, to provide a graceful adaptation to the changes instead of losing the connection between the UL1 and LL1 if the new conditions cannot support the previous parameters of the connection. Thus, the adaptive fronthaul protocol has provisions for adapting to conditions of the fronthaul link and radio network by changing the way data is communicated over the fronthaul link. Characteristics of an adaptive fronthaul protocol may include, but are not limited to, adapting a compression of the fronthaul uplink information and/or fronthaul downlink information, adapting an amount of loss of data caused by the compression, changing a parameter of the RAN based on characteristics of the fronthaul link, bypassing a function of a second-layer protocol of the RAN based on characteristics of the fronthaul link, using information from a second-layer protocol to change parameters in the a first-layer protocol, or other adaptations in how the fronthaul link is used. Such an adaptive fronthaul protocol allows a much more cost effective link, such as a packet-switching network, to be used in the fronthaul link. In some cases, this may allow for deployments without any special provisioning of the fronthaul link by allowing the fronthaul information to be transmitted over standard internet connections.

The RAN architecture described above provides for a large amount of flexibility in the configuration of a particular RAN 200. But if the fronthaul link is not deterministic, the upper layers of the RAN protocol may have difficulty knowing how to dynamically adjust to changing characteristics of the fronthaul link. The UL1s may be able to monitor the fronthaul(s) that they utilize to communicate with their respective LL1s and can then provide information about the fronthaul links to other modules in the RAN 200. The UL1 251 may determine a communication quality parameter for communication between the UL1 251 and the LL1 221 and send a message related to the communication quality parameter to its associated L2 271 over communication link 261, another UL1 255 over communication link 263, a OAM 280 over communication link 265, or any other module in the RAN 200 over any useable communication link.

The communication quality parameter may be any type of parameter related to communication between a UL1 251 and a LL1 221, such as, but not limited to, bandwidth of the fronthaul link 241, latency of the fronthaul link 241, an error on the fronthaul link 241, or a computational availability of the UL1 251 or LL1 221. The communication quality parameter may be expressed as a maximum, a minimum, an average, a median, or as some other statistical measure or may be expressed as a recommended value, and may relate to the uplink, the downlink, or both. Other examples of the communication quality parameter include a number of bytes per subframe, bytes per second, a limitation in terms of scheduling (e.g., number of resources blocks, tones, layers, constellation order, antennas, or the like), or as a boolean (e.g., Layer-1 may request the upper layers to skip scheduling unicast traffic for said subframe, for example in case of fronthaul congestion). The message may, as a non-limiting example, include the communication quality parameter, and/or the message may be determined based on the communication quality parameter by calculating, by the UL1 251, a maximum number of wireless terminals that can be supported by a the LL1 221 based on the communication quality parameter and providing that number to the OAM 280 or L2 271.

In the RAN 200, UL1 251 is coupled to LL1 221 and LL1 223 by a shared fronthaul link 241 and to LL1 225 by a separate fronthaul link 243. LL1 221 may be in communication with a first wireless terminal, LL1 223 may be in communication with a second wireless terminal, and LL1 225 may be in communication with a third wireless terminal. Due to an increase in the data load by the first terminal, LL1 221 may utilize a larger amount of the available bandwidth of the fronthaul link 241. This bandwidth of the fronthaul link 241 used by LL1 221 may be monitored by UL1 251 which may determine that the amount of bandwidth available on the fronthaul link 241 for the other LL1 223 is reduced. A message indicating a limit for the data throughput that LL1 223 can support may then be created and sent to L2 271 which may then know not to increase the amount of data that can be sent to or received from the second wireless terminal. In addition, the UL1 251 may determine that its processing capabilities are close to being fully realized, which may be a second communication quality parameter related to a second LL1 225 utilizing a second fronthaul link, and indicate to the L2 271 that there is also a limit in the number of resource blocks that can be processed for LL1 225, even though it doesn't share the fronthaul link 241 with LL1 221.

In some embodiments, the L2 271 may respond to the message related to the communication quality parameter by sending a message to the UL1 251 to control one of the LL1s 221-225. The received message may tell the UL1 251 to change some aspect of the functionality of the LL1, such as a compression parameter for use on the fronthaul link, a modulation to be used for the radio-frequency communication with the wireless terminal, or some other aspect of the LL1's operation. The UL1 251 may then send a message to one of more of the LL1s 221-225 to change that aspect of the LL1's operation.

In some embodiments, the message may be sent to an OAM 280 of the RAN 200 which can then use the information of the message to determine configuration settings for the RAN 200 or otherwise maintain some aspect of the RAN 200.

Figure 3:
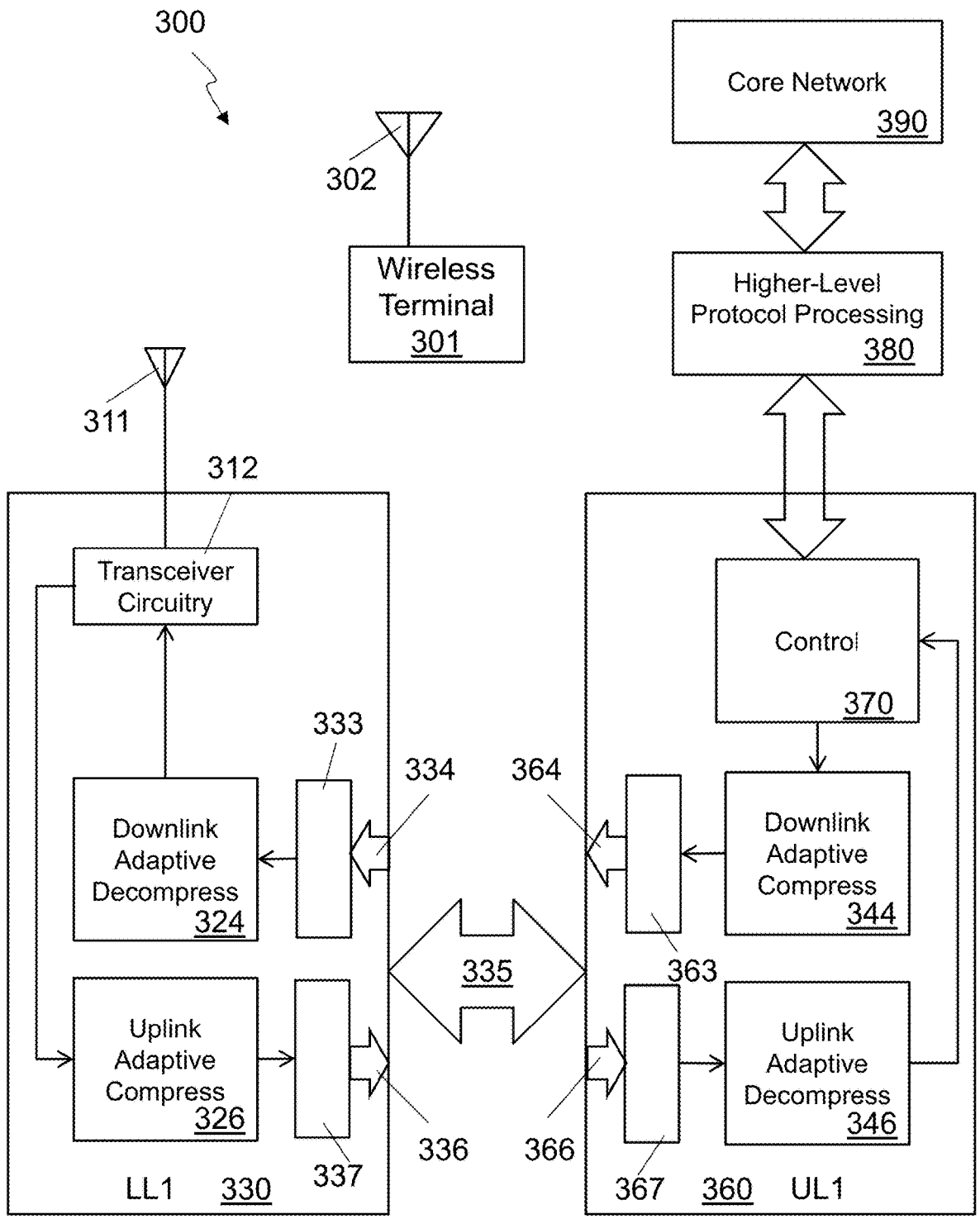
FIG. 3 is a detailed block diagram of an embodiment of a distributed RAN with split physical layer.

FIG. 3 is a detailed block diagram of an embodiment of a distributed RAN 300 with split physical layer. The RAN 300 includes a LL1 330 coupled to at least one antenna 311, and a UL1 360 coupled to a module 380 performing higher-level protocol processing, such as the MAC layer, which is then coupled to the core network 390. A fronthaul link 335 is coupled to the UL1 360, through interface circuitry 364, 366, and the LL1 330. The fronthaul link may utilize an adaptive fronthaul protocol for communication between the UL1 360 and the LL1 330. The LL1 330 includes electronic circuitry to perform at least a first portion of a first-level protocol of a radio access network (RAN) 300 for communicating between the wireless terminal 301 and the core network 390. The UL1 360 is configured to perform a second portion of a first-level protocol of the RAN 300 and may include control 370 to manage the fronthaul link 335 and communicate with other modules regarding the status of the fronthaul link 335. The RAN 300 provides the wireless terminal 301 with access to the core network 390 through an RF signal sent between the antenna 302 of the wireless terminal 301 and the antenna 311 of the LL1 330.

In embodiments, the LL1 330 includes receiver circuitry, shown as transceiver circuitry 312, to receive a radio frequency signal representing uplink (UL) data from the at least one antenna 311 and convert the received radio frequency signal to digital baseband samples. LL1 330 also includes adaptive compression circuitry 326 to adaptively compress the digital baseband samples into fronthaul uplink information based on information received from the UL1 360 over the fronthaul link 335, and interface circuitry 334, 336 to send the fronthaul uplink information to the UL1 360 over the fronthaul link 335 using the adaptive fronthaul protocol. In some systems the adaptive compression performed by the adaptive compression circuitry 326 is lossy. The UL1 360 may include an uplink adaptive decompression block 346 to decompress the uplink data received from the LL1 330.

The UL1 360 may be configured to send frequency-domain information over the fronthaul link 335 to the LL1 330. The frequency-domain information may include a tonemap descriptor describing a set of tones to be used by the LL1 330 to generate a radio frequency signal for transmission to the wireless terminal 301, and data identifying modulation symbols for tones of the set of tones, and times associated with the modulation symbols. This representation of the frequency-domain information is form of adaptive compression performed by the downlink adaptive compression block 344.

In systems, the LL1 330 may include downlink adaptive decompression circuitry 324 that has expansion circuitry to generate complex frequency-domain samples based on the data identifying the modulation symbols for the tones, and inverse Fourier Transform circuitry to create complex time-domain baseband samples from the complex frequency-domain samples. The LL1 330 may also include transmitter circuitry, shown as transceiver circuitry 312, to convert the complex time-domain baseband samples into a radio frequency signal to send to the wireless terminal 301 through the at least one antenna 311 at the times associated with the modulation symbols.

In various embodiments, the LL1 330 may include a buffer 333 to hold irregularly received downlink data from the fronthaul link 335 to enable a constant stream of information to be provided for a radio frequency signal sent to the wireless terminal 301. A size of the buffer 333 may be adapted based on a fronthaul quality indicator or information received from the UL1 360. The LL1 330 may include a buffer 337 to hold irregularly sent uplink data for the fronthaul link 335 to enable a constant stream of information to be received from a radio frequency signal sent by the wireless terminal 301. A size of the buffer 337 may be adapted based on a fronthaul quality indicator or information received from the UL1 360. The UL1 360 may also include an uplink buffer 367 and/or a downlink buffer 363.

In some systems, the UL1 360 can determine a communication quality parameter related to the communication with the LL1 330 and send a message related to the communication quality parameter to the higher level protocol processing module 380. The communication quality parameter may be determined based, at least in part, on information received by the UL1 360 from the LL1 330. The information received by the UL1 360 from the LL1 330 may include, but is not limited to, LL1 buffer status information, LL1 buffer overrun indications, LL1 buffer underrun indications, information about a received radio frequency signal, or any combination thereof. In some systems the communication quality parameter is determined based, at least in part, on a latency of the fronthaul link 335, a bandwidth of the fronthaul link 335, errors on the fronthaul link 335, undelivered packets on the fronthaul link 335, out-of-order packets on the fronthaul link 335, fronthaul buffer 333, 337, 363, 367 utilization, including overruns and/or underruns, or any combination thereof.

In response to the message, the higher-level processing module 380 may determine one or more parameters of the RAN 300 related to the LL1 330 to modify, such as, but not limited to, frequency-domain allocation size, modulation and coding schemes, number of users, number of grants, pattern of usable subframes, anticipation of scheduling with respect to a time index it refers to, a compression parameter, or any combination thereof.

In addition, the higher-level protocol processing module 380 may determine a signal quality parameter for radio frequency communication with the wireless terminal 301 and send a message to the UL1 360 based on the signal quality parameter. A non-limiting example of a signal quality parameter may be a signal-to-noise ratio (SNR). The UL1

260 may then determine a compression parameter for the fronthaul link based on the signal quality parameter and communicate the compression parameter to the LL1 330. Non-limiting examples of the compression parameter include a quantization level and a number of antennas used for the radio frequency communication with the wireless terminal.

The Small Cell Forum, an industry consortium, has published a document that defines application programming interfaces (APIs) between a MAC layer (i.e. a second-level protocol) and a PHY layer (i.e. a first-level protocol) in a radio area network, specifically targeted at small cell implementations. Document #082.09.04 entitled "FAPI and nFAPI specifications" which issued on Jan. 18, 2017, (available at time of filing from http://scf.io/en/documents/082_-_nFAPI_and_FAPI_specifications.php) is incorporated by reference herein for any and all purposes. While the document defines two separate APIs, FAPI (functional application program interface) and nFAPI (network functional application program interface), for the purposes of this disclosure and the claims, a nFAPI message is meant to refer to either a message as defined for either FAPI or nFAPI. Section 2.3 of that specification defines nFAPI messages which are used for communication between a virtual network function (VNF—which may perform include the MAC layer of the RAN protocol) and the physical network function (PNF—which may include the UL1 functionality).

Figure 4:
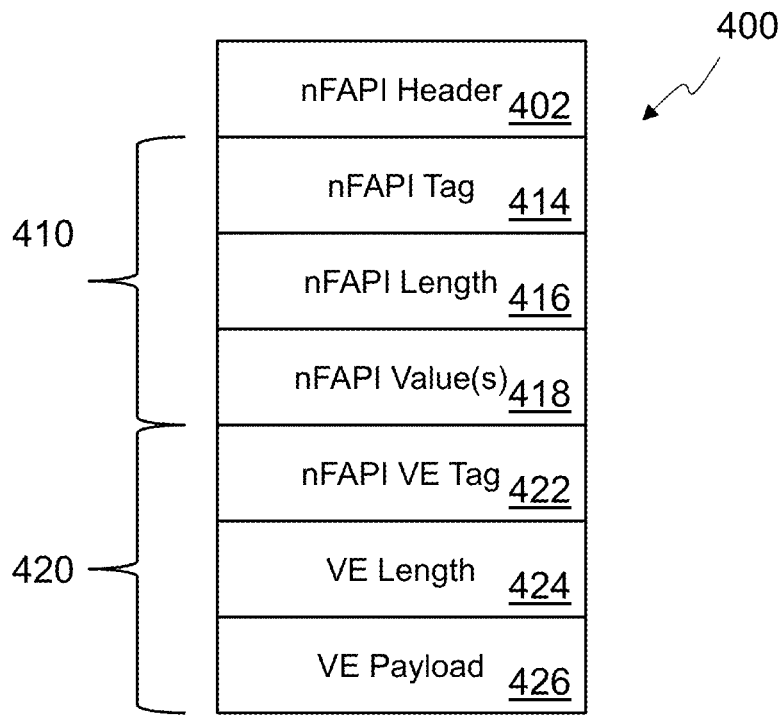
FIG. 4 shows a nFAPI message with a vendor extension.

FIG. 4 shows a nFAPI message 400 with a vendor extension 420. The nFAPI message 400 includes a nFAPI header 402. The nFAPI header 402 includes a PHY ID, a Message ID which may specify any valid nFAPI message, including a P4, P5, or P7 message, and additional information dependent upon the type of message. The nFAPI message 400 may also include any number of nFAPI structures 410 following the nFAPI header 402 or may not include a nFAPI structure for a standard nFAPI message at all. The nFAPI structure 410 includes a nFAPI Tag 414, and may include a nFAPI Length 416, and nFAPI Value(s) 418. Various standard nFAPI structures 410 are defined within the nFAPI specification.

The nFAPI message 400 may include a vendor extension message 420, The vendor extension message 420 includes a nFAPI VE Tag 422 which may have a value between 0xF000 and 0xFFFF, the meaning of which is defined on a vendor specific basis with the vendor being identified from the organizational unique identifier (OUI) contained within the PNF PARAM response message. The vendor extension message 420 also includes a VE length value 424, and may include a payload 426 of data. The VE length value 424 defines the size of the vendor extension message 420 including the VE Tag 422, VE length value 424, and VE payload 426. The vendor extension message 420 may be used for any purpose defined by the vendor identified by the OUI.

Any message defined herein may be formatted as a nFAPI vendor extension, depending on the embodiment. In some embodiments, the message send by the UL1 which is based on the communication quality parameter may be formatted as a vendor extension message compliant with the network functional application platform interface (nFAPI) specification. A nFAPI, message including the vendor extension message may then be sent to the VNF. As one non-limiting example, a vendor may define a VE Tag of 0xF123 to be a report of the current bandwidth of the fronthaul for a particular LL1 and define a payload of 16 bits to report the bandwidth in megabits per second and 16 bits to provide an identifier of the LL1. So if the fronthaul for the LL1 with an ID of 0x0002 has a bandwidth of one gigabit, the vendor extension message would be 0xF123, 0x0008, 0x03E8, 0x0002.

Figure 5:
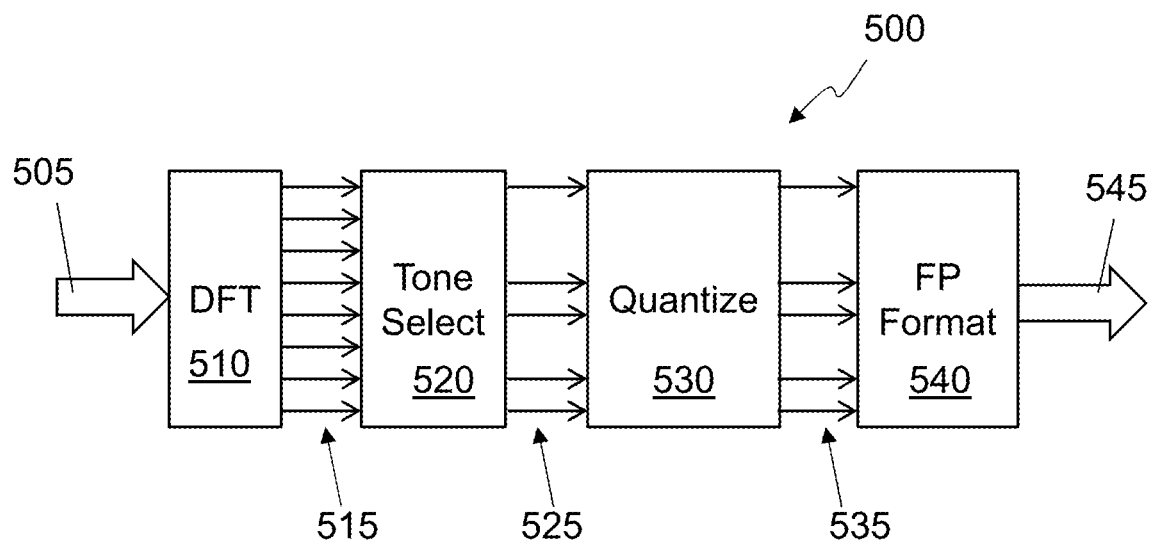
FIG. 5 shows a data flow diagram for uplink data in an embodiment of a lower first-level protocol unit (LL1)

FIG. 5 shows a data flow diagram 500 for uplink data in an embodiment of a lower first-level protocol unit (LL1). Frequency-domain (FD) samples may be transmitted in at least one downlink (DL) connection (that is, from UL1 to LL1) and/or in at least one uplink (UL) connection (that is, from LL1 to UL1). Each of the connections utilizes bandwidth resources on the fronthaul link. To reduce the bandwidth utilization, the FD samples may be adaptively compressed as shown in data flow 500. The data flow 500 shown is for UL data, but many of the same techniques could be used for DL FD data. The data flow 500 may describe the function of the adaptive compression circuitry 326 in FIG. 3. The various aspects of managing the UL (or DL) may be controlled using information received by the UL1 as discussed elsewhere in this disclosure.

One way of adaptively compressing the FD data is to discard tones of the underlying OFDM modulation that are not used during a particular block of time. In embodiments, a discrete Fourier transform (DFT) 510 converts the digital baseband samples 505 into frequency-domain information 515 for a set of received tones, and tone selection 520 adaptively compresses the frequency-domain information 515 into a set of reportable tones 525 by discarding information related to at least one tone of the set of received tones identified based on the information received from the UL1.

Another way that the FD data can be compressed is by using a dynamic quantization level. The FD samples are generated at a finite-precision. The representation of the UL FD samples and the DL FD samples may be done at different quantization levels, or bit-widths. For example, the UL FD bit-width may be greater (i.e. based on a smaller quantization level) than the DL FD bit-width, reflecting the fact that the UL FD samples are expected to have greater dynamic range because they are affected by the fading occurring over the radio channel.

In one implementation, the finite-precision representation of the UL FD may use different quantization levels for different conditions of the radio links between the relevant LL1s and the relevant UEs, or for different conditions of the links between the relevant LL1s and the relevant UL1s, or the like. Similar dynamic quantization level strategies may be used in DL FD transmissions. For example, the FD samples may be transmitted with quantization level that varies as a function of the radio signal-to-noise ratio (SNR), reflecting the fact that greater quantization noise in the FD samples may be tolerated as the radio SNR decreases. Similarly, the FD samples may be transmitted with quantization level that varies as a function of the PHY modulation scheme and/or the PHY code rate, reflecting the fact that more quantization noise in the FD samples may be tolerated in the presence of low-order PHY modulation schemes and/or low PHY code rates (e.g., rate-0.3 QPSK transmissions may be more robust to quantization noise than rate-0.8 64QAM transmissions). Alternatively or in addition, the FD samples may be transmitted with a quantization level that varies as a function of the number of co-scheduled users or the number of spatial MIMO streams, reflecting the fact that quantization noise may be more detrimental in the case of multiple co-scheduled spatial streams. Moreover, the FD samples may be transmitted with a quantization level that adapts to the fronthaul link bandwidth available between LL1 and UL1, either statically or dynamically. For example, when the fronthaul link is shared with others, the FD samples may be transmitted with larger quantization level (fewer bits per sample) as the available bandwidth on the shared link decreases.

FD samples may have different representations (e.g., different bit-widths and the like) on different tones of group of tones of the same symbol. For example, if different physical channels with different SINRs, modulation formats, code rates, or the like, are multiplexed in the same symbol, FD samples corresponding to different channels may have different representations.

In some embodiments, the quantization may be performed as a part of the Fourier transform operation. So in some systems, the adaptive compression circuitry 500 includes Fourier transform circuitry 510 to convert the digital baseband samples 505 into frequency-domain information 535 with a quantization level dynamically determined based on information received from the UL1 or determined by the LL1 based on estimates of received radio frequency power, received radio frequency noise, signal quality, modulation scheme, coding scheme, or any combination thereof. The information received from the UL1 may be determined by the UL1, based on a radio signal-to-noise ratio, a physical layer modulation scheme, a physical layer code rate, an available bandwidth of the fronthaul link, or any combination thereof.

Another method of adaptively compressing the data is to use a shared-exponent format for the data. In some embodiments, a real or complex floating-point representation of the FD samples is used. For example, a mantissa/exponent floating-point representation may be used (e.g., see standard IEEE 754), and a group of N complex-valued samples may be typically represented by using one mantissa and one exponent for each complex dimension, which gives total of 2N mantissas and 2N exponents. By utilizing a shared-exponent format, one common, or shared, exponent may be used to represent the entire set of the 2N real-valued numbers, associating the 2N mantissas with that common exponent, thus saving bandwidth of (2N−1) exponents' representations. Note that, when the 2N real-valued numbers have similar ranges, the quantization noise for the shared-exponent format and the quantization noise for the described individual-exponent representation may be considered similar. This representation may be used, for example, for FD samples that are expected to have similar power, such as FD samples from the same LTE resource block, or samples from radio resources that are close in a suitable radio dimension (e.g., time, frequency, space), or that belong to the same physical channel, or the like. Similar strategies may be used in DL FD transmissions and for real-valued FD floating-point representations.

So in some systems, the adaptive compression circuitry 500 includes Fourier transform circuitry 510 to convert the digital baseband samples 505 into frequency-domain information 515 comprising at least a first frequency-domain sample having a floating-point format and a second frequency-domain sample having the floating-point format. Formatter circuitry 540 may be included to compress the frequency-domain information 515, based on information received from the UL1, into a shared-exponent format that includes a mantissa value for the first frequency-domain sample, a mantissa value for the second frequency-domain sample, and a single shared-exponent value for both the first frequency-domain sample and the second frequency-domain sample. The fronthaul uplink information 545 then includes the frequency-domain information in the shared-exponent format. The fronthaul uplink information 545 may also include additional mantissa values for additional frequency-domain samples associated with the single shared-exponent value.

Figure 6:
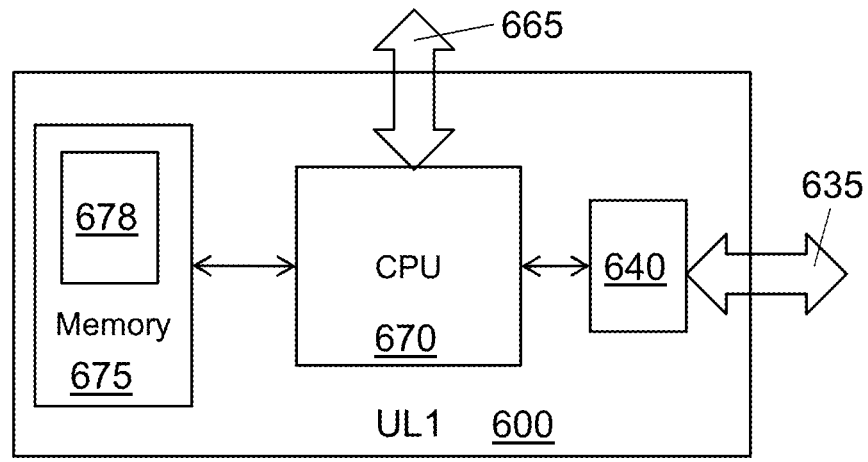
FIG. 6 is a hardware block diagram of an embodiment of an upper first-level protocol unit (UL1)

FIG. 6 is a hardware block diagram of an embodiment of an upper first-level protocol unit (UL1). The UL1 600 includes a processor 670, one or more memory devices 675 coupled to the processor 670 and storing instructions 678 to configure the processor 670, and interface circuitry 640 coupled to the processor 670 and a fronthaul link 635. The UL1 600 also includes an interface 665 for communication with other modules performing tasks related to the protocol of the RAN (e.g., a second-level protocol of the RAN) or other functions of the RAN (e.g., OAM). The other modules may be implemented in a separate hardware device than the UL1 600 or may be implemented as a separate function on the same device 600. In at least one embodiment, the UL1 functionality is implemented on a first virtual machine running on a general purpose computer and the other module is implemented on a second virtual machine running on the same general purpose computer and the interface 665 includes a protocol for communicating between the virtual machines, such as a virtual local-area network (vLAN). The processor 670 is configured to perform at least a first portion of a first-level protocol of the RAN and communicate over the fronthaul link 635 with a LL1 using an adaptive fronthaul protocol. In some embodiments, the UL1 600 supports a RAN protocol utilizing an Evolved Universal Terrestrial Radio Access Network (E-UTRAN), the core network includes an Evolved Packet Core (EPC), the first-level protocol uses an Evolved Universal Terrestrial Radio Access (E-UTRA) physical-layer (PHY) protocol, and the second-level protocol uses an E-UTRA medium access control (MAC) protocol.

The processor 670 may perform a variety of functions to manage and control the LL1. In some embodiments, the processor 670 is configured to send setup information to the LL1 that identifies a set of receivable tones and/or a quantization level to use for UL data. In addition. The processor 670 may adaptively compress DL data sent over the fronthaul link 635.

The UL1 600 may also send messages to other modules in the RAN based on a communication quality parameter. The communication quality parameter may be determined based, at least in part, on information received from the LL1 over the fronthaul link 635 and the information received from the LL1 may include LL1 buffer status information, LL1 buffer overrun indications, LL1 buffer underrun indications, information about a received radio frequency signal, or any combination thereof. In some embodiments, communication quality parameter is determined based, at least in part, on a latency of the fronthaul link, 635 a bandwidth of the fronthaul link, errors on the fronthaul link 635, undelivered packets on the fronthaul link 635, out-of-order packets on the fronthaul link 635, UL1 buffer overruns, UL1 buffer underruns, or any combination thereof. In response to the message received from the UL1, the other module may control one or more parameters of the RAN. They control may be done within the other module or may be communicated to the UL1 600 for it to control either within the UL1 600 or by communicating with the LL1. Examples for a parameter of the RAN that may be controlled include, but are not limited to, frequency-domain allocation size, modulation and coding schemes, number of users, number of grants, pattern of usable subframe, anticipation of the scheduling with respect to the time index it refers to, or any combination thereof.

The memory 675 may constitute an article of manufacture encoding computer-readable instructions 678 that, when applied to a computer system 600, instruct the computer system 600 to perform a method for facilitating communication between a core network and a wireless terminal in an upper first-level protocol unit (UL1) of a radio access network (RAN). The method may include performing a first portion of a first-level protocol of the RAN in the computer system 600, and communicating over a fronthaul link 635 with a lower first-level protocol unit (LL1) in an apparatus separate from the computer system 600. The method may also include determining a communication quality parameter for communication between the computer system and the LL1, and sending a message related to the communication quality parameter to an entity other than the LL1.

Thus, the UL1 can be an apparatus 600 for facilitating communication between a core network and a wireless terminal. The apparatus includes a hardware interface 640 to a fronthaul link 635 for communication with a LL1, a processor 670 coupled to the hardware interface 640 to the fronthaul link 635, and memory 675, coupled to the processor 670, having instructions 678 stored therein. The processor 670 may be programmed by the instructions 678 to perform a first portion of a first-level protocol of the RAN in the apparatus 600, the apparatus 600 being a first apparatus. The processor 670 may also be programmed to communicate over a fronthaul link 635 with a lower first-level protocol unit (LL1), the LL1 in a second apparatus separate from the first apparatus. In addition, the processor 670 may be programmed to determine a communication quality parameter for communication between the first apparatus 600 and the LL1, and send a message related to the communication quality parameter to an entity other than the LL1.

Figure 7:
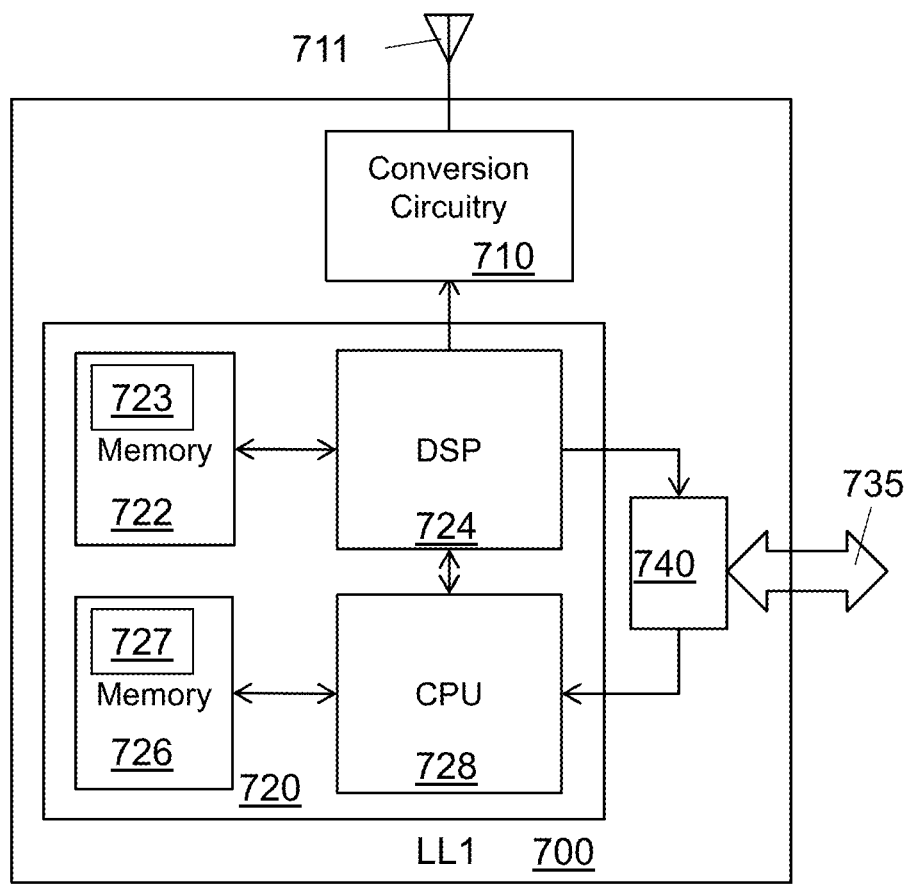
FIG. 7 is a hardware block diagram of an embodiment of a LL1.

FIG. 7 is a hardware block diagram of an embodiment of a LL1 700. The LL1 700 includes a processing subsystem 720 which includes at least one processor 724, 728 and at least one tangible computer memory 722, 726 coupled to the at least one processor 724, 728. The at least one tangible computer memory 722, 726 holds instructions 723, 727 executable by the at least one processor 724, 728, to perform at least a second portion of the first-level protocol of the RAN. The LL1 700 also includes conversion circuitry 710, such as circuitry to modulate/demodulate a radio-frequency signal to communicate with a wireless terminal using antenna 711.

In some embodiments, the processing subsystem 720 may include a general purpose CPU 728 and a digital signal processor (DSP) 724 with various tasks split between the processors 724, 728 such as having the DSP 724 perform the FFT and IFFT operations using instructions 723 stored in memory 722 and having the CPU 728 provide control functionality using instructions 727 stored in memory 726. In other embodiments, the processing subsystem 720 may only include the DSP 724 and may not include the CPU 728. In such embodiments, the DSP 724 may be able to provide control functionality or the control functionality may be provided by other circuitry. In other embodiments, the processing subsystem 720 may only include the CPU 728 and not include the DSP 724. In such embodiments, the CPU 728 may be able to perform signal processing functions such as one or more of a FFT, IFFT, selection, quantization, adaptive compression, expansion, formatting, and the like. Or dedicated circuitry may be provided for some of the signal processing functions so the CPU 728 can provide the overall control functionality. Other embodiments may have any number of processors of any type, depending on the embodiment.

The LL1 700 also includes a fronthaul interface 740 coupled to a fronthaul link 735. The fronthaul link 735 may also be coupled to a UL1 performing a first portion of the first-level protocol of the RAN. The fronthaul link 735 may be any type of suitable communication link, including, but not limited to, a non-deterministic computer network such as an Ethernet network, a wireless network using internet protocol (IP), or a heterogeneous network using a variety of protocols with protocol translation units interposed between various network segments.

Depending on the hardware architecture of the LL1, certain implementations may perform certain operations in accelerated, dedicated hardware (e.g., FPGA) and certain other operations in off-the-shelf CPUs (e.g., Intel or ARM CPUs) or DSPs. Some embodiments may provide accelerated processing of blocks of downlink data, which may be referred to as downlink records (DR). This may be implemented as an accelerated "process_DR" API that takes one or more DRs and generates, processes, and/or maps the corresponding samples.

Another implementation may provide accelerated processing of OFDM symbols, that is, there may be an accelerated "process symbol" API that reads all DRs with at least one tone mapped on that specific OFDM symbol, and generates, process, and/or map that OFDM symbol so that it is ready for transmission. In this latter implementation, it may be helpful for the LL1 to have access to a table that associates each OFDM symbol of the period with the zero or more DRs which have at least one tone belonging to that OFDM symbol. That table may be pre-calculated by the UL1 and provided to the LL1.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
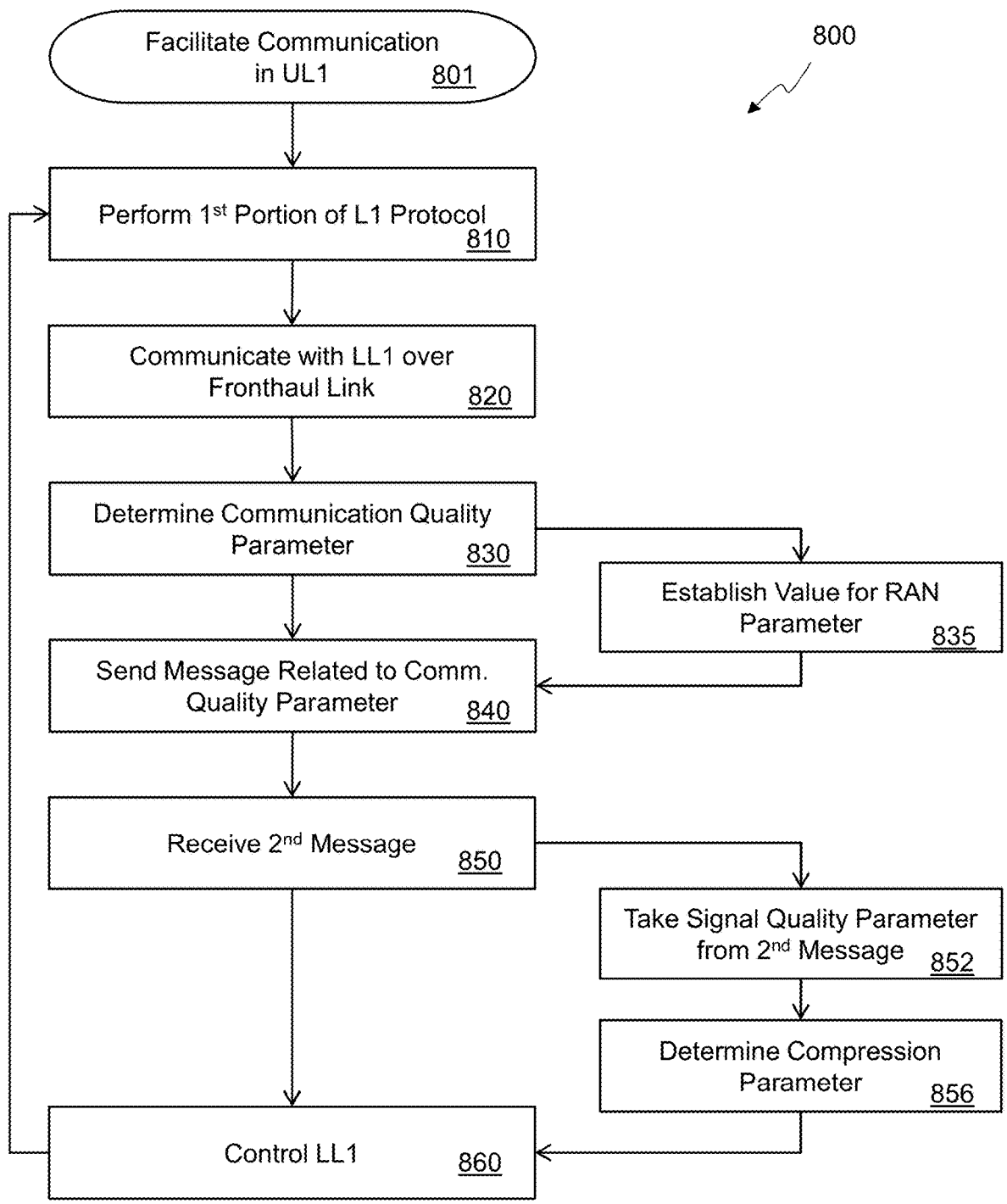
FIG. 8 shows a flowchart for an embodiment of facilitating communication between core network and a wireless terminal in a distributed RAN with a split physical layer.

FIG. 8 shows a flowchart 800 for an embodiment of a method for facilitating communication between core network and a wireless terminal in a distributed RAN with a split physical layer. The flowchart starts 801 and includes performing 810 a first portion of a first-level protocol of the RAN in a first apparatus. The RAN protocol may be based on an Evolved Universal Terrestrial Radio Access Network (E-UTRAN) with the core network acting as an Evolved Packet Core (EPC). The first-level protocol may be consistent with an Evolved Universal Terrestrial Radio Access (E-UTRA) physical-layer (PHY) protocol.

The flowchart 800 continues with communicating 820 over a fronthaul link with a lower first-level protocol unit (LL1); the LL1 is in a second apparatus separate from the first apparatus. In at least some embodiments, the fronthaul link includes a non-deterministic communication link. A non-deterministic communication link may have a latency, an arbitration, a bandwidth, a jitter, a packet order, a packet delivery, or some other characteristic of the communication link that cannot be determined with certainty in advance and in some embodiments, the fronthaul link may have a variable throughput with a minimum throughput less than a maximum throughput of the wireless terminal. An Ethernet network or some other packet-based protocol with non-guaranteed in-order packet delivery and/or non-guaranteed packet delivery such as those utilizing an internet protocol (IP) may be considered a non-deterministic communication link.

A communication quality parameter for communication between the first apparatus and the LL1 is determined 830. The communication quality parameter may be based on a condition of the fronthaul link and/or may include a bandwidth, a latency, a jitter, or an error parameter. An error parameter may include a measurement or estimate of packet losses, out-of-order packet delivery, bit error rate, or any other link-specific or general error condition. A condition of the fronthaul link may vary over time, such as a bandwidth or latency. For some fronthaul links, the condition may depend upon an environmental condition such as a noise level on the link. This may be particularly relevant to wireless fronthaul links but also may be relevant to wired links, depending on the embodiment. In some embodiments the condition may depend upon a current load on the fronthaul link, especially those sharing a communication path between a UL1 and multiple LL1s, multiple UL1s and multiple LL1s, or those sharing a communication path with devices that are unrelated to the RAN, such as those using a general computer network (e.g., an intranet or internet) as the fronthaul link.

In some embodiments, the communication quality parameter may be based on an availability of a computational resource in the first apparatus which is performing the UL1 functionality or the availability of a computational resource in the second apparatus which is performing the LL1 functionality. The computational resource (e.g processing cycles, memory, bus bandwidth, and the like), may be shared between the first-level protocol processing and other functionality such as other protocol layers of the RAN, OAM for the RAN, operating system functions, or processing tasks unrelated to the RAN. Depending on the embodiment, the computational load in the first and/or second apparatus may vary over time due to scheduling of operations by an operating system, varying tasks/threads assigned to the apparatuses, varying numbers wireless terminals supported through a particular data path, varying throughput requested by particular wireless terminals, interrupts from devices unrelated to the RAN, and various other computational needs in a general purpose computer known to one of ordinary skill in the art.

The communication quality parameter may be determined 830 using any technique appropriate and may be determined at regular intervals or based on events that may occur in the UL1, LL1, or the fronthaul link. In some embodiments, the determining 830 may be done using specialized instrumentation (hardware and/or software) dedicated to that purpose, performing test operations, querying a network controller or similar device, software controlling or supervising the fronthaul transport network, or by monitoring parameters, such as latency, during normal operation.

Some embodiments may include establishing 835 a value for a RAN parameter based on the communication quality parameter. The RAN parameter may include one or more scheduling constraints such as, but not limited to, a number of resource blocks, a number of wireless terminals handled by the LL1, a number of spatial streams from the LL1 dedicated to the wireless terminal, or a modulation encoding scheme. A RAN parameter may be calculated using an equation based on a communication quality parameter, such as dividing an available bandwidth of the fronthaul link (i.e. a communication quality parameter) by a constant to calculate a number of resource blocks that can be supported. In other embodiments, a RAN parameter may be established by using a lookup table based on one or more communication quality parameters. In some embodiments, the RAN parameter may be established dynamically from the communication quality parameter(s) using heuristics. In some embodiments, the RAN parameter may be established for a particular LL1, as opposed to a RAN parameter applying to all data streams associated with the UL1.

The flowchart 800 continues with sending 840 a message related to the communication quality parameter to an entity other than the LL1. If a value for the RAN parameter was determined based on the communication quality parameter, the value for the RAN parameter may be included in the message. Any type of communication protocol or link may be used to send 840 the message, but in some embodiments, the message is formatted as a vendor extension message compliant with the network functional application platform interface (nFAPI) specification, and sent 840 as a nFAPI, message to an entity performing a second-level protocol of the RAN.

In some embodiments, the message is sent periodically to reflect a current state of the communication quality parameter, but in some case, the message is sent in response to detecting an event related to the communication quality parameter, such as detecting a change in the communication quality parameter or detecting an error in the fronthaul link communication. The message may include an indication of the current value of the communication quality parameter, an indication of the change in the communication quality parameter since the last report, or any other indication based on the communication quality parameter. In some embodiments, the message may be sent 840 in response to receiving a request for the communication quality parameter.

The message may be sent 840 to any functional block in the RAN, including other UL1s or an OAM. In some embodiments, the message is sent by the UL1 to a software module performing a second-level protocol of the RAN, which may be running on the same general purpose computer as the UL1, or may be running on hardware different than that used by the UL1 over a computer network, a telecom network, a dedicated communications link, or any other communication medium. The software module performing the second-level protocol of the RAN may use the information received in the message for scheduling of data communications with the wireless terminal, pass the information to higher-level protocol processing blocks, or use it for any other purpose.

In some embodiments, the method may include receiving 850 a second message from the entity other than the second apparatus in response to the message. The second message may be related to a control of a second LL1 coupled to the first apparatus by the fronthaul link shared with the first LL1, or to control of a second LL1 coupled to the first apparatus by a second fronthaul link. The contents of the second message may then be used to control 860 the second LL1.

In some embodiments, the second message may be received 850 from an entity performing a second-level protocol of the RAN. The message may indicate a signal quality parameter 852 for radio frequency communication with the wireless terminal. A compression parameter for the fronthaul link may then be determined 856 based on the signal quality parameter and the compression parameter communicated 860 to the LL1. This may be done due to differing signal-to-noise ratios (SNR) that may be encountered in communication with various wireless terminals and if there is a wireless terminal scheduled to work at a low SNR, there is no reason to try to capture the signal with a very high accuracy, so a compression parameter that allows for more loss in the compression may be used. An example of this is changing a quantization level so that fewer bits are used for low SNR signals, or changing the number of antennas used for the radio frequency communication with the wireless terminal.

During the process of developing the concepts presented herein, the inventors realized that spatial processing performed at the LL1 can enable significant fronthaul compression when the number of transmitted spatial layers is lower than the number of physical antennas, as is typical in massive MIMO systems. Similarly, constellation mapping can save significant fronthaul bandwidth, because integer indexes within predefined constellations (that is, bits) are transmitted in place of complex numbers. And since downlink physical channels (e.g., CRS, PDCCH, PDSCH, or the like) with different constellations, spatial schemes, and the like are intermixed within the same period (a basic reference time (e.g., a slot in the 3GPP terminology), that is pre-agreed, either hardcoded, or via semi-static configuration, between LL1 and UL1) an efficient way to represent and describe all these signals would be advantageous. It may be highly inefficient to represent all those signals in the same way, that is, with the same spatial processing/scheme, constellation, and the like.

The basic unit to describe a downlink transmission with uniform parameters, described in the following as Downlink Record (DR), is described following:

Data Representation Format:

For each spatial layer (see below): data can be formatted as either IQ (frequency-domain complex samples) or as constellations. The constellation format may point to one of the pre-stored constellations look-up tables (e.g., 64-QAM).

Data:

Depends on Data Representation Format above, data can be a vector of complex numbers, or a vector of bits. Transfer of complex numbers can be allowed for generality, as certain signals may not belong to predefined constellations.

Spatial schemes may include:

Mode (e.g., SFBC, Linear Precoding, and the like);

Number of Layers;

Precoding Index (optional) such as an index within a codebook, or explicit matrix. The latter approach gives more flexibility, but may significantly increase the size of the DR, thus the fronthaul utilization;

Mapping to physical antennas (which could be semi-static) and carriers, in case of multi-carrier system; and/or Power gain.

Resource Indicators may include:

Unique timestamp of the period this DR refers to; and

Tones.

In the simplest approach, tones are described as adjacent "blocks" in the time-frequency grid (e.g., firstTone, numTones, firstSymbol, numSymbols)

In order to better describe channels which occupy periodically repeating tones (e.g., CRS), a "stepTone" parameter may be added, where the tones occupied by the considered signal would be firstTone, firstTone+stepTone, firstTone+2*stepTone, and the like.

Certain other signals have a highly distributed and "scrambled" nature, as for example PDCCH. An efficient way to represent said signals may be a bitmap, to be applied to all or part of the system tones, where each bit in the bitmap correspond to a tone, and the value of the bit denote whether the tone is used by this specific DR, or it doesn't.

Another efficient way to represent tones for signals sparse in the frequency domain (e.g., PDCCH) would be a plain list of used tones. An exemplary way to represent a list of tones would be [symbol, numTones,{$tone_0$, $tone_1$, . . . ,$tone_{numTones-1}$}] where symbol denotes one of the OFDM symbols and numTones is the number of tones in the list that follows.

Another way, similar but potentially more efficient than the plain list, can be used to represent signals which maps over (small) groups of consecutive tones, where the groups are sparse. An exemplary way to represent a list of groups of tones would be [symbol, numTonesInGroup,numTones,{$tone_0$, $tone_1$, . . . , $tone_{numTones-1}$}] where symbol denotes one of the OFDM symbols, numTonesInGroup is the number of tones in a group, and numTones is the number of tones in the following list. This represents the following tones: {$tone_0$, $tone_0+1$, $tone_0+numTonesIn-Group-1$, $tone_1$, $tone_1+1$, ..., $tone_1+numTonesIn-Group-1$, ...}

A special attribute may be used to determine which of the representations above is used, followed by parameters specific of that representation. In another implementation, the actual resource set may be a union, intersection, or difference between two or more sets, each set being defined using one of the representation methods above.

In some embodiments, constellations, precoding matrices (that is, "codebooks"), and the like may be stored at the LL1 during configuration/OAM from the UL1. Multiple DRs can be packaged in a downlink protocol unit (DPU). For example, the various physical channels in a downlink slot may be represented by multiple DRs in a DPU.

It may be convenient to force a specific order, or priority, among the DRs. Specifically, if two DRs map to colliding tones, a priority is needed to determine which of the two signals should be used on the colliding tones. In order to achieve this feature, different approaches are possible:

The LL1 processes the DRs in the order they are stored in the DPU, so that if a DR maps over tones used before by another DR, signals on those tones will be replaced by the new DR.

A more general approach boils down to assigning a "priority index" to each DR.

DRs with the same priority index are guaranteed to have non-overlapping resources (tones).

If a tone is used by two or more DRs, the one with the highest priority index wins, that is, overwrites the signal from all other DRs on that tone.

The latter approach is more general, and can potentially guarantee a more efficient implementation since it simplifies parallel processing of DRs with the same priority index (as they never collide on the same resources).

As an example a DPU may include at least one DR that represents at least one PDSCH channel, and at least one DR that represents CRS signals. The two DRs may have colliding tones, and the latter DR(s) (for CRS) may have a higher priority index as the former DR(s) (for PDSCH). In this case, the data associated to tones used by CRS, but defined within the Resource Indicator of the DR(s) for PDSCH, are overwritten, and dummy data sample shall be sent by the UL1 corresponding to overwritten tones.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or micro-code. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g., 1 to 5 includes 1, 2.78, π, 3.33, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method for facilitating communication between a core network and a wireless terminal in an upper first-level protocol unit (UL1) of a radio access network (RAN), the method comprising:
    performing a first portion of a physical-layer (PHY) protocol of the RAN in a first apparatus;
    communicating over a fronthaul link with a lower first-level protocol unit (LL1), the LL1 in a second apparatus separate from the first apparatus, wherein a remaining portion of the PHY protocol is performed by the LL1;
    determining a communication quality parameter for communication between the first apparatus and the LL1; and
    sending a message related to the communication quality parameter to an entity other than the LL1.

2. The method of claim 1, further comprising receiving a request for the communication quality parameter, wherein said sending is performed in response to said receiving.

3. The method of claim 1, further comprising detecting an event related to the communication quality parameter, wherein said sending is performed in response to said detecting.

4. The method of claim 1, wherein the communication quality parameter is based on a condition of the fronthaul link.

5. The method of claim 1, wherein the communication quality parameter is based on an availability of a computational resource in the first apparatus.

6. The method of claim 1, the fronthaul link comprising a non-deterministic communication link.

7. The method of claim 1, further comprising:
    establishing a value for a RAN parameter based on the communication quality parameter; and
    including the value for the RAN parameter in the message.

8. The method of claim 7, the RAN parameter comprising one or more scheduling constraints.

9. The method of claim 8, wherein the one or more scheduling constraints comprise a number of resource blocks, a number of wireless terminals handled by the LL1, a number of spatial streams from the LL1 dedicated to the wireless terminal, or a modulation and coding scheme.

10. The method of claim 1, wherein the message is sent to a second software module performing a Medium Access Control (MAC) layer protocol of the RAN, wherein the first portion of the PHY protocol of the RAN is performed by a first software module running on the first apparatus.

11. The method of claim 1, wherein the message is sent over a computer network to a third apparatus running a software module performing a Medium Access Control (MAC) layer protocol of the RAN.

12. The method of claim 1, wherein the message is sent to an Operations, Administration, and Management (OAM) module of the RAN.

13. The method of claim 1, wherein the message is sent to a second software module in a second data path between the core network and another wireless terminal, the second software module outside of a first data path between the core network and the wireless terminal, wherein the first portion of the PHY protocol of the RAN is performed by a first software module, running on the first apparatus, in the first data path.

14. The method of claim 1, further comprising:
    communicating with a second LL1, the second LL1 in a third apparatus, separate from the first apparatus and the second apparatus, and in a data path for communication between the core network and a second wireless device;
    determining a second communication quality parameter for communication between the first apparatus and the second LL1; and
    sending a second message related to the second communication quality parameter to an entity different than the LL1 and the second LL1.

15. The method of claim 1, further comprising receiving a second message from the entity other than the LL1 in response to the message, the second message related to a control of a second LL1 coupled to the first apparatus by the fronthaul link.

16. The method of claim 1, further comprising receiving a second message from the entity other than the LL1 in response to the message, the second message related to a control of a second LL1 coupled to the first apparatus by a second fronthaul link.

17. The method of claim 1, further comprising receiving a second message indicating a signal quality parameter for radio frequency communication with the wireless terminal from said entity, said entity performing a Medium Access Control (MAC) layer protocol of the RAN;
    determining a compression parameter for the fronthaul link based on the signal quality parameter; and
    communicating the compression parameter to the LL1.

18. The method of claim 1, further comprising
    formatting the message as a vendor extension message compliant with the network functional application platform interface (nFAPI) specification; and
    sending a nFAPI message, including the message formatted as the vendor extension message, to said entity, said entity performing a Medium Access Control (MAC) layer protocol of the RAN.

19. An article of manufacture comprising a tangible medium, that is not a transitory propagating signal, encoding computer-readable instructions that, when applied to a computer system, instruct the computer system to perform a method for facilitating communication between a core network and a wireless terminal in an upper first-level protocol unit (UL1) of a radio access network (RAN), the method comprising:

performing a first portion of a physical-layer (PHY) protocol of the RAN in a first apparatus;

communicating over a fronthaul link with a lower first-level protocol unit (LL1), the LL1 in a second apparatus separate from the first apparatus, wherein a remaining portion of the PHY protocol is performed by the LL1;

determining a communication quality parameter for communication between the first apparatus and the LL1; and sending a message related to the communication quality parameter to an entity other than the LL1.

20. An apparatus for facilitating communication between a core network and a wireless terminal, the apparatus comprising:

a hardware interface to a fronthaul link for communication with a lower first-level protocol unit;

a processor coupled to the hardware interface to the fronthaul link; and memory, coupled to the processor, having instructions stored therein;

the processor programmed by the instructions to:

perform a first portion of a physical-layer (PHY) protocol of the RAN in the apparatus, the apparatus being a first apparatus;

communicate over the fronthaul link with the LL1, the LL1 in a second apparatus separate from the first apparatus, wherein a remaining portion of the PHY protocol is performed by the LL1; and determine a communication quality parameter for communication between the first apparatus and the LL1; and send a message related to the communication quality parameter to an entity other than the LL1.

21. The method of claim 1 wherein the RAN utilizes fronthaul split Option 7-1 or Option 7-2 as defined by 3GPP.

22. A system for facilitating communication between a core network and a wireless terminal comprising:

a baseband unit (BBU) comprising an upper first-level protocol unit (UL1) of a radio access network (RAN) configured to perform a first portion of a physical-layer (PHY) protocol of the RAN;

a remote radio unit (RRU) comprising a lower first-level protocol unit (LL1) configured to perform a remaining portion of the PHY protocol; and an entity other than the RRU;

wherein the BBU is configured to communicate over a fronthaul link with the LL1 in the RRU;

wherein the system is configured to determine a communication quality parameter for communication between the first apparatus and the LL1; and wherein the system is configured to send a message related to the communication quality parameter to said entity.

23. The system of claim 22, wherein the system is configured to send the message related to the communication quality parameter in response to receiving a request for the communication quality parameter.

24. The system of claim 22, wherein the system is configured to send the message related to the communication quality parameter in response to detecting an event related to the communication quality parameter.

25. The system of claim 22, wherein the communication quality parameter is based on a condition of the fronthaul link.

26. The system of claim 22, wherein the communication quality parameter is based on an availability of a computational resource in the RRU.

* * * * *